(12) United States Patent
Hasegawa et al.

(10) Patent No.: US 12,149,138 B2
(45) Date of Patent: *Nov. 19, 2024

(54) ELECTRICAL INSULATOR ASSEMBLY, STATOR AND MOTOR

(71) Applicant: AICHI ELECTRIC CO., LTD., Kasugai (JP)

(72) Inventors: Masahiro Hasegawa, Kasugai (JP); Shoji Mano, Kasugai (JP); Takashi Hori, Kasugai (JP)

(73) Assignee: AICHI ELECTRIC CO., LTD., Kasugai (JP)

( * ) Notice: Subject to any disclaimer, the term of this patent is extended or adjusted under 35 U.S.C. 154(b) by 216 days.

This patent is subject to a terminal disclaimer.

(21) Appl. No.: 17/930,870

(22) Filed: Sep. 9, 2022

(65) Prior Publication Data

US 2023/0307976 A1 Sep. 28, 2023

(30) Foreign Application Priority Data

Mar. 23, 2022 (JP) .................... 2022-047124

(51) Int. Cl.
 *H02K 3/32* (2006.01)
 *H02K 3/18* (2006.01)
(52) U.S. Cl.
 CPC .............. *H02K 3/325* (2013.01); *H02K 3/18* (2013.01)
(58) Field of Classification Search
 CPC ..................................................... H02K 3/325

(Continued)

(56) References Cited

U.S. PATENT DOCUMENTS 8,067,867 B2 * 11/2011 Ueta ...................... H02K 3/522
 310/194
8,432,082 B2 * 4/2013 Fukunaga .............. H02K 3/325
 310/214

(Continued)

FOREIGN PATENT DOCUMENTS

JP         863299734 A    12/1988
JP       2002171704 A     6/2002

(Continued)

OTHER PUBLICATIONS

Unpublished U.S. Appl. No. 17/691,707.

*Primary Examiner* — Alexander Talpalatski
(74) *Attorney, Agent, or Firm* — J-TEK LAW PLLC; Jeffrey D. Tekanic; Scott T. Wakeman

(57) ABSTRACT

Electrical insulator assemblies fitted onto stator teeth each have a first flange and a second flange. An outer peripheral surface of the first flange has first and second recessed parts on first and second sides of a through hole in a circumferential direction. The first recessed part is open radially outwardly to the first side in the circumferential direction and to a second side in an axial direction. The second recessed part is open radially outwardly to the second side in the circumferential direction and to the second side in the axial direction. The first flange has a projection formed on a side surface on the first side in the circumferential direction and protruding to the first side in the circumferential direction and a projection formed on a side surface on the second side in the circumferential direction and protruding to the second side in the circumferential direction.

10 Claims, 16 Drawing Sheets

(58) Field of Classification Search
USPC .......................................................... 310/208
See application file for complete search history.

(56) References Cited

U.S. PATENT DOCUMENTS

| | | | |
|---|---|---|---|
| 2006/0033395 A1* | 2/2006 | Izumi | H02K 3/18 |
| | | | 310/194 |
| 2007/0200450 A1* | 8/2007 | Yukitake | H02K 15/022 |
| | | | 310/194 |
| 2011/0309711 A1 | 12/2011 | Brown | |
| 2016/0020659 A1* | 1/2016 | Takahashi | H02K 3/28 |
| | | | 310/208 |
| 2020/0119600 A1 | 4/2020 | Inuzuka | |

FOREIGN PATENT DOCUMENTS

| | | | |
|---|---|---|---|
| JP | 2015047072 A | | 3/2015 |
| JP | 2015133808 A | | 7/2015 |
| JP | 2016072997 A | | 5/2016 |
| JP | 2016195488 A | | 11/2016 |
| JP | 2016195489 A | | 11/2016 |
| JP | 2016220400 A | | 12/2016 |
| JP | 2017085756 A | | 5/2017 |
| JP | 2017184400 A | | 10/2017 |
| JP | 2017184401 A | | 10/2017 |
| JP | 2018153056 A | | 9/2018 |
| JP | 2018153057 A | * | 9/2018 |
| JP | 2018153058 A | * | 9/2018 |
| JP | 2019004599 A | | 1/2019 |
| JP | 2019180170 A | | 10/2019 |
| JP | 2019180171 A | | 10/2019 |
| WO | 2017175358 A1 | | 10/2017 |

* cited by examiner

ELECTRICAL INSULATOR ASSEMBLY, STATOR AND MOTOR

TECHNICAL FIELD

The present disclosure generally relates to electrical insulator assemblies that are configured to be respectively fitted onto teeth of a stator core, to a stator having the electrical insulator assemblies fitted onto the teeth of the stator core, and to a motor comprising the same.

BACKGROUND ART

Various kinds of motors having a stator and a rotor have been used, for example, as a compressor-driving motor, a vehicle-driving motor and an onboard-equipment-driving motor. Particularly, a motor (more specifically, a so-called "concentrated winding motor") in which a stator winding (winding wire) is wound around teeth of a stator core of the stator in a concentrated manner has been used in such applications. In a concentrated winding motor, the stator windings are respectively wound around the teeth via (over) electrical insulator assemblies.

Further, as for such a concentrated winding motor, motors having a stator core of a split structure have been provided in order to increase the number of turns of the stator windings (to increase the fill factor of the stator windings within slots). The stator core of a split structure is formed by a plurality of split cores.

Such motors using a stator core having a split structure are disclosed, for example, in Japanese Unexamined Patent Application Publication No. 2018-153056 and Japanese Unexamined Patent Application Publication No. 2018-153057.

The motors disclosed in these JP patent publications include a stator core, a plurality of electrical insulator assemblies, stator windings and a plurality of electrical insulation members.

The stator core is formed by a first core member having a plurality of teeth, and a second core member having a yoke.

The electrical insulator assemblies are respectively fitted onto the teeth of the first core member. The stator windings are respectively wound around the electrical insulator assemblies. The stator windings and the teeth are insulated by the electrical insulator assemblies.

Each of the electrical insulator assemblies has a first flange, a second flange and a body. The first and second flanges extend in the axial direction and the circumferential direction. The second flange is disposed radially inward of the first flange. The body is disposed between the first and second flanges and extends in the radial direction. The body has a through hole that is open to an outer peripheral surface of the first flange and an inner peripheral surface of the second flange, and the teeth are respectively inserted into the through holes.

The outer peripheral surface of the first flange has first and second recessed parts respectively formed on first and second sides of the through hole in the circumferential direction. The first recessed part is open radially outwardly and to a first side in the circumferential direction. In other words, the first recessed part is formed by a bottom surface extending in the axial direction and the circumferential direction and a plurality of wall surfaces formed continuously to ends of the bottom surface on first and second sides in the axial direction and on a second side in the circumferential direction. The second recessed part is open radially outwardly and to the second side in the circumferential direction. In other words, the second recessed part is formed by a bottom surface extending in the axial direction and the circumferential direction and a plurality of wall surfaces formed continuously to ends of the bottom surface on the first and second sides in the axial direction and on the second side in the circumferential direction.

The stator core is formed by assembling the first and second core members with the electrical insulator assemblies fitted onto the teeth of the first core member.

Each of the electrical insulation members has first and second end parts extending in the axial direction and the circumferential direction on the first and second sides in the circumferential direction.

The electrical insulation member is arranged across the electrical insulator assemblies adjacent to each other in the circumferential direction between the adjacent electrical insulator assemblies and a yoke of the stator core. In other words, the electrical insulation member is inserted into a gap between the electrical insulator assemblies adjacent to each other in the circumferential direction and the yoke of the stator core. Then the first end part is arranged within the second recessed part of the electrical insulator assembly arranged on the first side in the circumferential direction, and the second end part is arranged within the first recessed part of the electrical insulator assembly arranged on the second side in the circumferential direction. The electrical insulation member insulates the stator windings and the yoke of the stator core.

SUMMARY

In the electrical insulator assemblies disclosed in the JP patent publications discussed above, the first and second recessed parts of the first flange are not open to the first and second sides in the axial direction. In other words, the first and second recessed parts have wall surfaces on the first and second sides in the axial direction. Therefore, the electrical insulation member needs to be tilted when inserted into the gap between the electrical insulator assemblies adjacent to each other in the circumferential direction and the yoke of the stator core. Specifically, the first end part of the electrical insulation member needs to be tilted with respect to the extending direction of the outer peripheral surface of the first flange of the electrical insulator assembly arranged on the first side in the circumferential direction, and the second end part of the electrical insulation member needs to be tilted with respect to the extending direction of the outer peripheral surface of the first flange of the electrical insulator assembly arranged on the second side in the circumferential direction.

Inserting the tilted electrical insulation member into the gap between the electrical insulator assemblies and the yoke of the stator core is a troublesome, time-consuming work. Further, the electrical insulation member may be damaged by contact with the stator core.

Accordingly, it is one non-limiting aspect of the present disclosure to provide electrical insulator assemblies that facilitate arrangement of electrical insulation members between the electrical insulator assemblies fitted onto adjacent teeth and a yoke of a stator core.

A first aspect of the present disclosure relates to electrical insulator assemblies.

The electrical insulator assemblies are configured to be respectively fitted onto radially-extending teeth that are spaced apart from each other in a circumferential direction and that also extend in an axial direction.

Each one of the electrical insulator assemblies has a first flange, a second flange and a body.

The first flange extends in the circumferential direction and the axial direction. The first flange has a first radially outer peripheral surface, a first radially inner peripheral surface, a first side surface on a first side in the circumferential direction, a second side surface on a second side in the circumferential direction, a first end surface on a first side in the axial direction and a second end surface on a second side in the axial direction.

The second flange is located radially inward of the first flange and extends in the circumferential direction and the axial direction. The second flange has a second radially outer peripheral surface, a second radially inner peripheral surface, a third side surface on the first side in the circumferential direction, a fourth side surface on the second side in the circumferential direction, a third end surface on the first side in the axial direction and a fourth end surface on the second side in the axial direction.

The body is provided between the first flange and the second flange and extends radially. The body has a through hole formed between the first flange and the second flange. The through hole extends radially and has openings in the first outer peripheral surface of the first flange and the second inner peripheral surface of the second flange. The through hole is configured such that the teeth can be inserted therein.

The first outer peripheral surface of the first flange has a first recessed part and a second recessed part that are respectively recessed radially inward on the first and second sides of the through hole in the circumferential direction. The first recessed part extends in the axial direction and the circumferential direction and is open radially outwardly to the first side in the circumferential direction and to the second side in the axial direction. The second recessed part extends in the axial direction and the circumferential direction and is open radially outwardly to the second side in the circumferential direction and to the second side in the axial direction.

In the electrical insulator assembly according to this disclosure, the first and second recessed parts of the first flange are open to the second side in the axial direction. Therefore, unlike a case where the electrical insulator assemblies disclosed in the JP patent publications discussed above are used, the electrical insulation member need not be tilted when inserted into a gap between the electrical insulator assemblies adjacent to each other in the circumferential direction and a yoke of a stator core.

Use of the electrical insulator assemblies of this disclosure facilitates arrangement of electrical insulation members between the electrical insulator assemblies fitted onto adjacent teeth and a yoke of a stator core.

In another embodiment of the electrical insulator assemblies, the first side surface of the first flange has a first projection that is formed on the second side of the through hole in the axial direction and protrudes to the first side in the circumferential direction, and the second side surface of the first flange has a second projection that is formed on the second side of the through hole in the axial direction and protrudes to the second side in the circumferential direction.

Use of the electrical insulator assemblies of this embodiment prevents the electrical insulation members from moving to the second side in the axial direction when a first end part of the electrical insulation member is arranged within the second recessed part of the electrical insulator assembly that is arranged on the first side in the circumferential direction and when a second end part of the electrical insulation member is arranged within the first recessed part of the electrical insulator assembly that is arranged on the second side in the circumferential direction.

In another embodiment of the electrical insulator assemblies, the first projection has an end surface formed continuously to (with) the first side surface on the first side in the axial direction and extending in the radial direction and the circumferential direction. The second projection has an end surface formed continuously to (with) the second side surface on the first side in the axial direction and extending in the radial direction and the circumferential direction.

The use of the electrical insulator assemblies of this embodiment more reliably prevents the electrical insulation members from moving to the second side in the axial direction.

In another embodiment of the electrical insulator assemblies, the first recessed part is formed by a first bottom surface, a first wall surface and a second wall surface. The first bottom surface extends in the axial direction and the circumferential direction. The first wall surface is formed continuously to (with) an end of the first bottom surface on the first side in the axial direction and extends in the circumferential direction and the radial direction. The second wall surface is formed continuously to (with) an end of the first bottom surface on the second side in the circumferential direction and extends in the axial direction and the radial direction.

The second recessed part is formed by a second bottom surface, a third wall surface and a fourth wall surface. The second bottom surface extends in the axial direction and the circumferential direction. The third wall surface is formed continuously to (with) an end of the second bottom surface on the first side in the axial direction and extends in the circumferential direction and the radial direction. The fourth wall surface is formed continuously to (with) an end of the second bottom surface on the first side in the circumferential direction and extends in the axial direction and the radial direction.

The use of the electrical insulator assemblies of this embodiment facilitates formation of the first and second recessed parts.

In another embodiment of the electrical insulator assemblies, the first outer peripheral surface of the first flange has a third projection that is formed on the first side of the through hole in the circumferential direction and on the first side of the through hole in the axial direction and protrudes radially outward. The first outer peripheral surface of the first flange further has a fourth projection that is formed on the second side of the through hole in the circumferential direction and on the first side of the through hole in the axial direction of the through hole and protrudes radially outward.

At least part of the first and second wall surfaces of the first recessed part is formed by an outer wall surface of the third projection. At least part of the third and fourth wall surfaces of the second recessed part is formed by an outer wall surface of the fourth projection.

The use of the electrical insulator assemblies of this embodiment further facilitates formation of the first and second recessed parts.

In another embodiment of the electrical insulator assemblies, the second flange has a fifth projection that protrudes from the third end surface to the first side in the axial direction. The fifth projection has a sixth projection that protrudes radially inward.

The second flange further has a seventh projection between the sixth projection and the through hole. The seventh projection protrudes radially inward from the second inner peripheral surface of the second flange and extends in the circumferential direction and the radial direction.

The sixth projection restricts movement of the stator winding wound around the fifth projection to the first side in the axial direction. Further, the provision of the seventh projection improves dielectric strength between the stator winding wound around the fifth projection and the corresponding tooth inserted into the through hole of the electrical insulator assembly.

The use of the electrical insulator assemblies of this embodiment improves dielectric strength.

A second aspect of the present disclosure relates to a stator.

The stator has a stator core, electrical insulator assemblies, stator windings and electrical insulation members formed of electrical insulation film.

The stator core has a yoke extending in an axial direction and a circumferential direction and a plurality of teeth spaced apart from each other in the circumferential direction on a radially inner side of the yoke and extending in the axial direction and a radial direction.

The electrical insulator assemblies are respectively fitted onto the teeth.

The stator windings are respectively wound around the electrical insulator assemblies.

Each of the electrical insulation members is arranged across the electrical insulator assemblies adjacent to each other in the circumferential direction between the adjacent electrical insulator assemblies and the yoke of the stator core.

Any one of the electrical insulator assemblies described above in the first aspect is used as the electrical insulator assemblies in the stator of the present disclosure.

Each of the electrical insulation members has a first end part extending in the axial direction and the circumferential direction on the first side in the circumferential direction and a second end part extending in the axial direction and the circumferential direction on the second side in the circumferential direction.

The first end part of the electrical insulation member is arranged within the second recessed part of the first flange of one of the adjacent electrical insulator assemblies that is arranged on the first side in the circumferential direction, and the second end part of the electrical insulation member is arranged within the first recessed part of the first flange of the other electrical insulator assembly that is arranged on the second side in the circumferential direction.

The stator of the second aspect of this disclosure has the same effect as the electrical insulator assemblies of the above-described first aspect.

In another embodiment of the stator, the electrical insulation member has a central part extending in the axial direction and the radial direction between the first and second end parts.

The central part of the electrical insulation member is arranged between the second side surface of the first flange of the one electrical insulator assembly arranged on the first side in the circumferential direction and the first side surface of the first flange of the other electrical insulator assembly arranged on the second side in the circumferential direction.

In the stator of this embodiment, the stator windings having different phases from each other that are respectively wound around the two adjacent electrical insulator assemblies are insulated.

In another embodiment of the stator, the stator core includes a first core member having the teeth and a second core member having the yoke.

In the stator of this embodiment, the stator windings can be wound around the electrical insulator assemblies before assembling the first and second core members. Thus, the number of turns of the stator windings can be increased to increase the fill factor of the stator windings.

A third aspect of the present disclosure relates to a motor.

The motor has a stator and a rotor that is rotatable relative to the stator. Any one of the stators described above in the second aspect can be used as the stator.

The motor of the present disclosure has the same effect as any one of the above-described electrical insulator assemblies or any one of the above-described stators.

By using the electrical insulator assemblies in the stator and the motor of the present disclosure, the electrical insulation members can be easily arranged between the electrical insulator assemblies fitted onto adjacent teeth and the yoke of the stator core.

DETAILED DESCRIPTION OF THE EMBODIMENTS

A representative embodiment according to the present disclosure is now described with reference to the drawings.

In this description, the term "axial direction" refers to an extending direction (x direction shown in the Figures) of a rotation center line P of a rotor, in the state in which the rotor is arranged to be rotatable relative to a stator. Further, the side shown by arrow x1 in the Figures (e.g. upper side in FIGS. 5 to 8) and the side shown by arrow x2 in the Figures (e.g. lower side in FIGS. 5 to 8) are defined as a "first side in the axial direction" and a "second side in the axial direction", respectively.

The term "circumferential direction" refers to a circumferential direction (z direction shown in the Figures) around the rotation center line P as viewed from the first or second side in the axial direction in the state in which the rotor is arranged to be rotatable relative to the stator. Further, in the circumferential direction, as viewed from the first side in the axial direction (see e.g., FIG. 2), the counterclockwise side (shown by arrow z1 in the Figures) and the clockwise side (shown by arrow z2 in the Figures) are defined as a "first side in the circumferential direction" and a "second side in the circumferential direction", respectively.

The terms "radially" and "radial direction" refer to an extending direction (y direction shown in the Figures) of a line passing through the rotation center line P as viewed from the first or second side in the axial direction in the state in which the rotor is arranged to be rotatable relative to the stator. Further, the side shown by arrow y1 (toward the rotation center line P) in the Figures and the side shown by arrow y2 (away from the rotation center line P) in the Figures are defined as the "inside in the radial direction" or a "first side in the radial direction", and the "outside in the radial direction" or a "second side in the radial direction", respectively.

As for an electrical insulator assembly, the terms "axial direction", "circumferential direction" and "radial direction" respectively refer to the "axial direction", "circumferential direction" and "radial direction" of the electrical insulator assembly in the state in which it is mounted on one of the teeth of a stator core.

Further, as for an electrical insulation member, the terms "axial direction", "circumferential direction" and "radial direction" respectively refer to the "axial direction", "circumferential direction" and "radial direction" of the electrical insulation member in the state in which it is inserted into the gap between the electrical insulator assemblies adjacent in the circumferential direction and the yoke of the stator core.

The "first side" and the "second side" in each of these directions may be defined in reverse.

A stator 100 that forms an embodiment of a motor according to the present disclosure is now described with reference to FIGS. 1 to 12.

Figure 1:
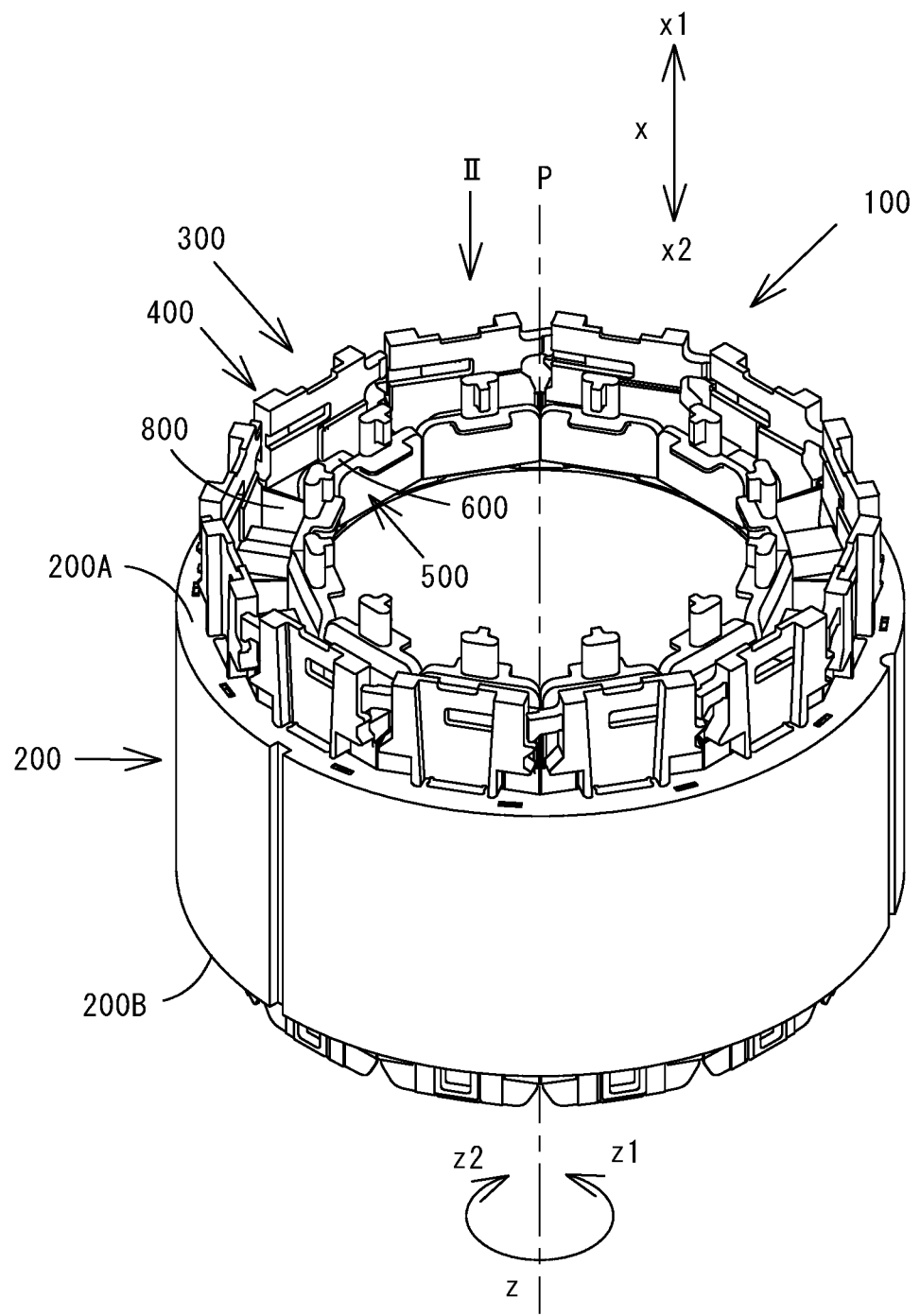
FIG. 1 is a perspective view of an embodiment of a stator according to the present disclosure.
Figure 2:
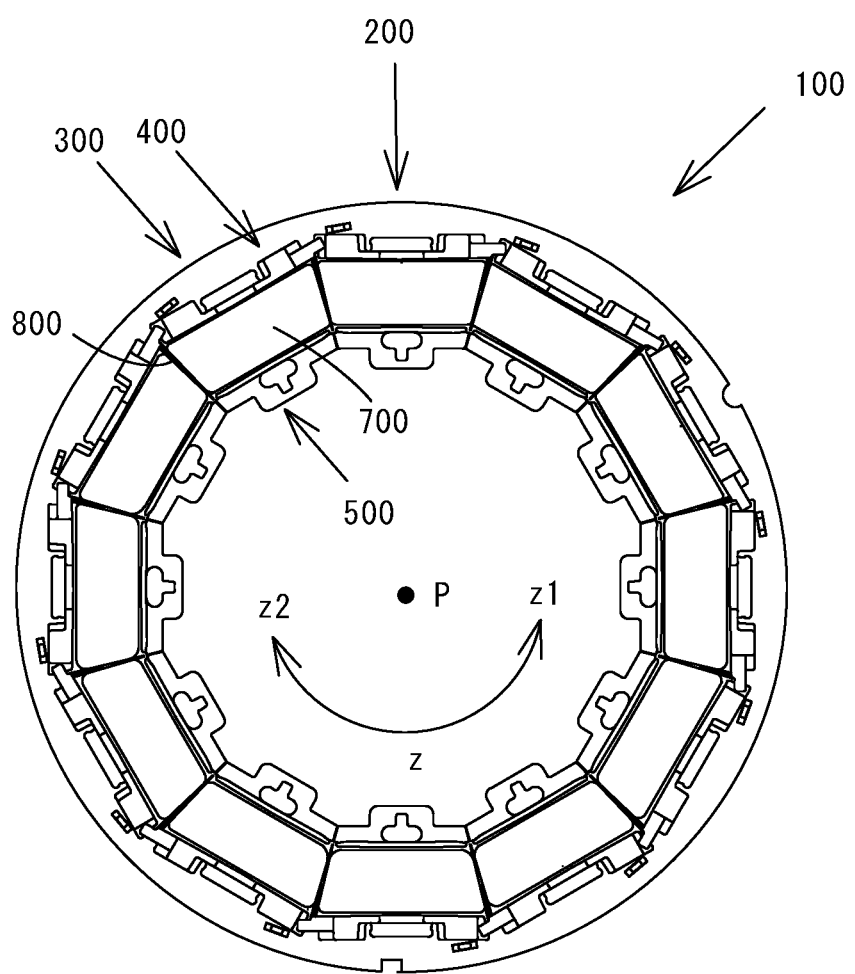
FIG. 2 is a top plan view of the stator of FIG. 1.
Figure 3:
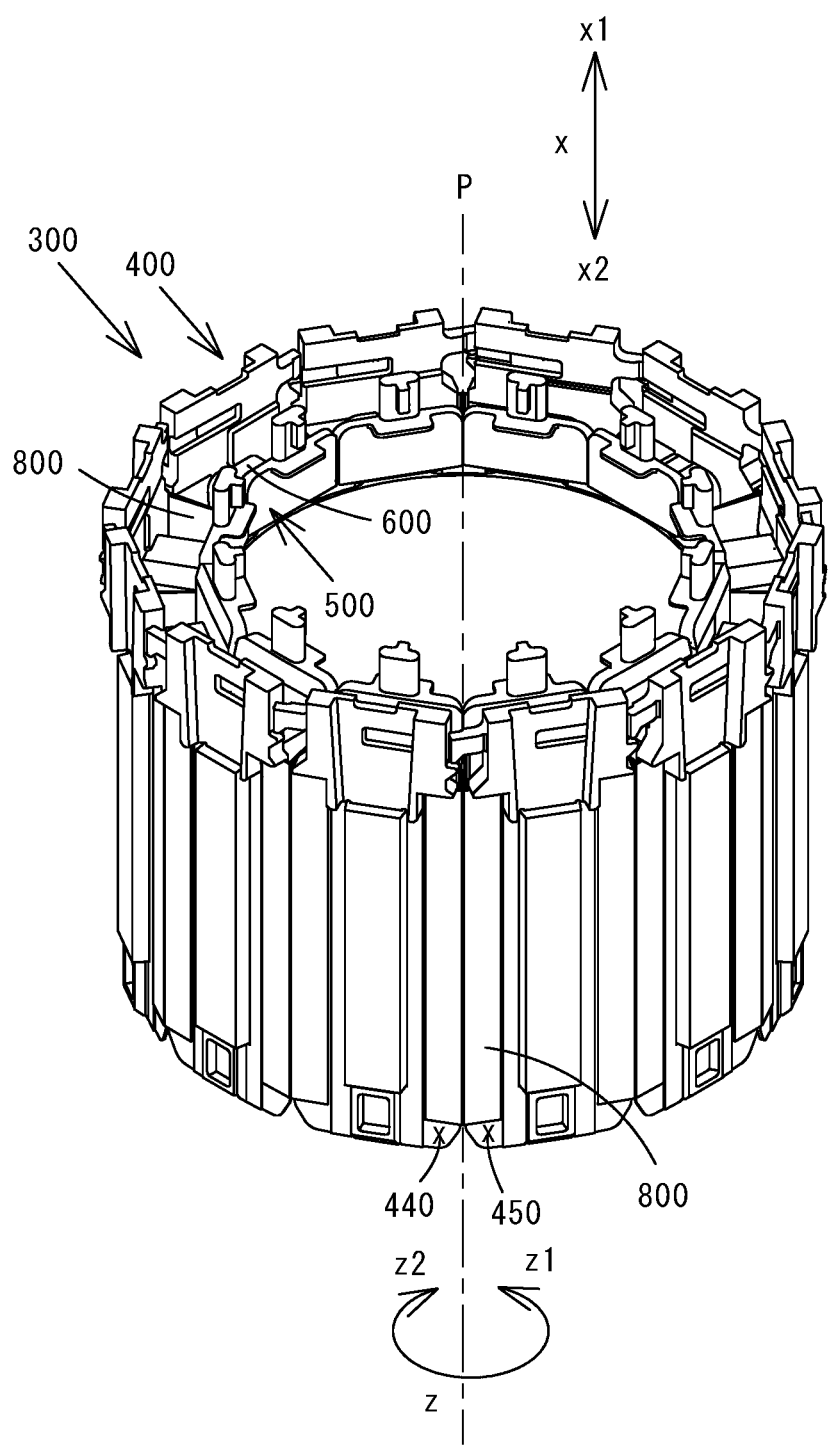
FIG. 3 is a perspective view of the stator of FIG. 1 with the yoke of the stator core removed.

As shown in FIGS. 1 to 3, the stator 100 of the embodiment includes a stator core 200, a plurality of electrical insulator assemblies 300, stator windings (coils) 700 and a plurality of electrical insulation members 800.

In FIGS. 1 and 3, the stator windings 700 are not shown for the sake of clarity in understanding the structure of the electrical insulator assemblies 300.

The stator core 200 has a tubular shape and has core end surfaces 200A and 200B respectively on the first side and the second side in the axial direction.

Figure 4:
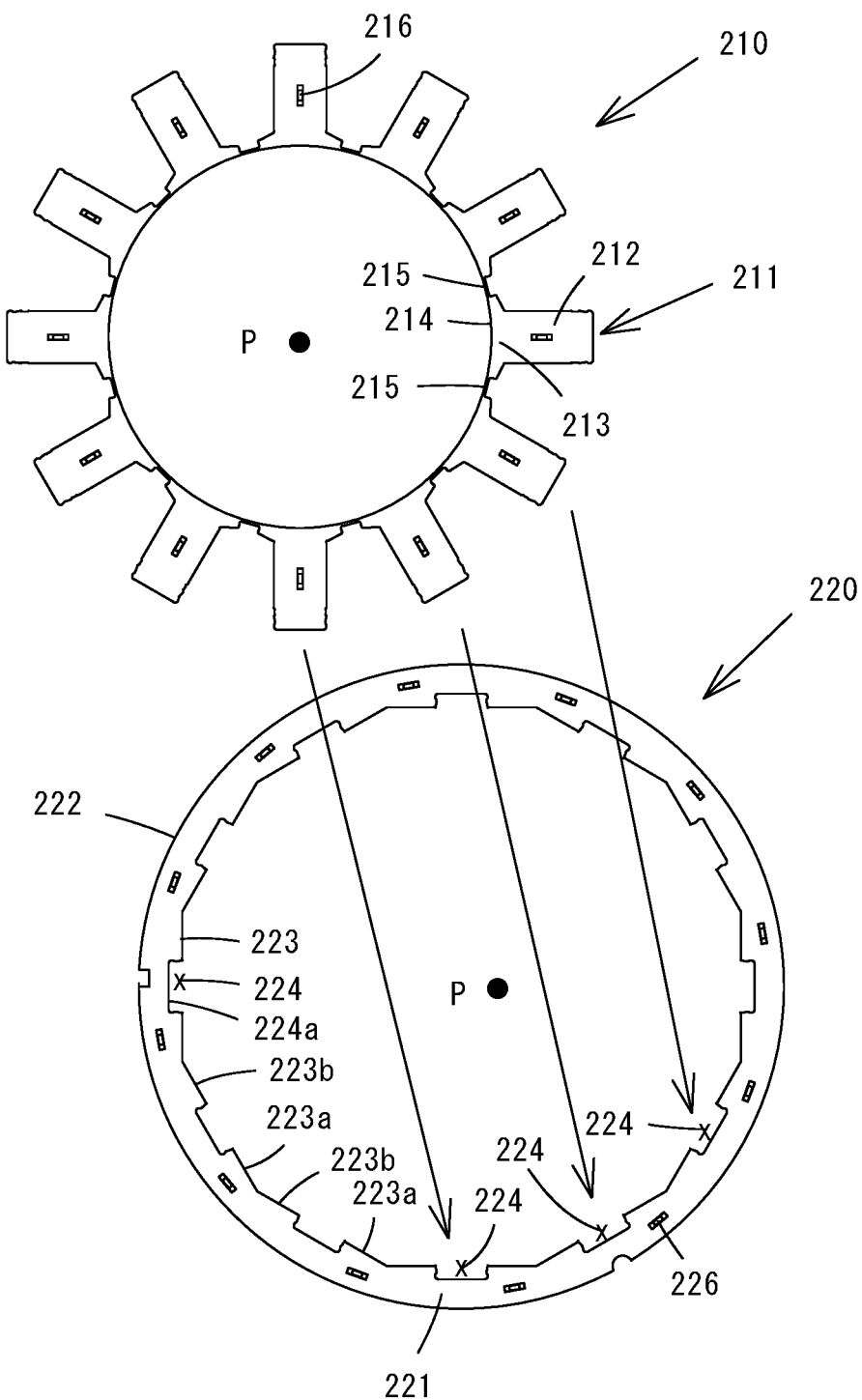
FIG. 4 is an exploded view of the stator core of the stator of FIG. 1.

The stator core 200 is configured to have a split structure. In this embodiment, as shown in FIG. 4, the stator core 200 includes a first core member 210 and a second core member 220.

The first core member 210 (also referred to as an "inner core") is a laminate of a plurality of electromagnetic steel sheets, which are stacked on top of each other and laminated together by using calking projections (connecting projections) 216.

The first core member 210 has a plurality of teeth 211 extending in the axial direction and the radial direction and spaced apart from each other in the circumferential direction. Each of the teeth 211 has a tooth base part 212 that extends in the axial direction and the radial direction and a tooth tip part 213, which is formed on (at) a radially-inner end of the tooth base part 212 and extends in the axial direction and the circumferential direction. The tooth tip part 213 has a tooth tip surface 214 on its radially inner side.

The tooth tip parts 213 of the teeth 211 are connected by connecting parts 215.

The second core member 220 (also referred to as an "outer core") is a laminate formed by a plurality of electromagnetic steel sheets, which are stacked on top of each other and laminated together by using calking projections (connecting projections) 226.

The second core member 220 has a yoke 221 extending in the axial direction and the circumferential direction. The yoke 221 has a yoke outer peripheral surface 222 and a yoke inner peripheral surface 223.

The yoke inner peripheral surface 223 has recess forming faces 224a that are recessed in the radial outward direction from the yoke inner peripheral surface 223. Each of the recess forming faces 224a defines a recess 224.

The yoke inner peripheral surface 223 has yoke inner peripheral surface parts 223a, 223b formed between adjacent ones of the recesses 224 (the recess forming faces 224a) in the circumferential direction. The yoke inner peripheral surface part 223a (223b) is inclined such that the width of the yoke 221 in the radial direction decreases from a connection between the yoke inner peripheral surface part 223a (223b) and the recess forming face 224a toward a center between the adjacent recesses 224 in the circumferential direction. A gap into which a first end part 810 and a second end part 840 of the electrical insulation member 800 can be inserted is defined by the yoke inner peripheral surface parts 223a, 223b, which will be described in detail below.

Radially-outer end parts of the teeth 211 (the tooth base parts 212) of the first core member 210 are press-fitted (or shrink-fitted or freeze-fitted) into the recesses 224 of the second core member 220. As a result, the stator core 200 is formed having the yoke 221 extending in the axial direction and the circumferential direction and the teeth 211 extending in the axial direction and the radial direction and spaced apart from each other in the circumferential direction on the radially inner side of the yoke 221.

The tooth tip surfaces 214 formed on the radially inner side of the tooth tip parts 213 collectively define a rotor insertion space into which the rotor (not shown) is inserted.

The stator 100 and the rotor that is rotatably inserted into the rotor insertion space form one representative, non-limiting motor according to the present disclosure.

The electrical insulator assembly 300 shown in FIGS. 5 to 10 is mounted on each of the teeth 211 of the stator core 200.

The electrical insulator assembly 300 is formed of resin (polymer) having electrical insulating properties, such as polybutylene terephthalate (PBT), polyphenylene sulfide (PPS), liquid crystal polymer (LCP) and nylon (polyamide).

The electrical insulator assembly 300 may also be referred to as "insulating bobbin", "resin bobbin" or "coil bobbin".

The electrical insulator assembly 300 has a first flange 400, a second flange 500 and a body 600.

The first flange 400 extends in the axial direction (x direction) and the circumferential direction (z direction). The first flange 400 has an outer peripheral surface 400A on its radially outer side (the arrow y2 side), an inner peripheral surface 400B on its radially inner side (the arrow y1 side), an (a first) end surface 401 on the first side (the arrow x1 side) in the axial direction, an (a second) end surface 402 on the second side (the arrow x2 side) in the axial direction, a (first) side surface 403 on the first side (the arrow z1 side) in the circumferential direction, and a (second) side surface 404 on the second side (the arrow z2 side) in the circumferential direction. The outer peripheral surface 400A extends in the axial direction and the circumferential direction.

In this embodiment, the outer peripheral surface 400A and the inner peripheral surface 400B correspond to non-limiting embodiments of a "first outer peripheral surface" and a "first inner peripheral surface" according to this disclosure, respectively. The end surface 401 and the end surface 402 correspond to non-limiting embodiments of a "first end surface" and a "second end surface" according to this disclosure, respectively. Further, the side surface 403 and the side surface 404 correspond to non-limiting embodiments of a "first side surface" and a "second side surface" according to this disclosure, respectively.

The second flange 500 is arranged radially inward (on the arrow y1 side) of the first flange 400 and extends in the axial direction and the circumferential direction. The second flange 500 has an outer peripheral surface 500A on its radially outer side, an inner peripheral surface 500B on its radially inner side, an (a first) end surface 501 on the first side in the axial direction, an (a second) end surface 502 on the second side in the axial direction, a (first) side surface 503 on the first side in the circumferential direction and a (second) side surface 504 on the second side in the circumferential direction. The inner peripheral surface 500B extends in the axial direction and the circumferential direction.

In this embodiment, the outer peripheral surface 500A and the inner peripheral surface 500B correspond to non-limiting embodiments of a "second outer peripheral surface" and a "second inner peripheral surface" according to this disclosure, respectively. The end surface 501 and the end surface 502 correspond to non-limiting embodiments of a "third end surface" and a "fourth end surface" according to this disclosure, respectively. Further, the side surface 503 and the side surface 504 correspond to non-limiting embodiments of a "third side surface" and a "fourth side surface" according to this disclosure, respectively.

The body 600 is formed (extends) between the first and second flanges 400, 500 and thus extends radially. The body 600 has a through hole 610. The through hole 610 is defined by inner wall surfaces 611 to 614 and has an opening 610a formed in the outer peripheral surface 400A of the first flange 400 and an opening 610b formed in the inner peripheral surface 500B of the second flange 500.

Figure 11:
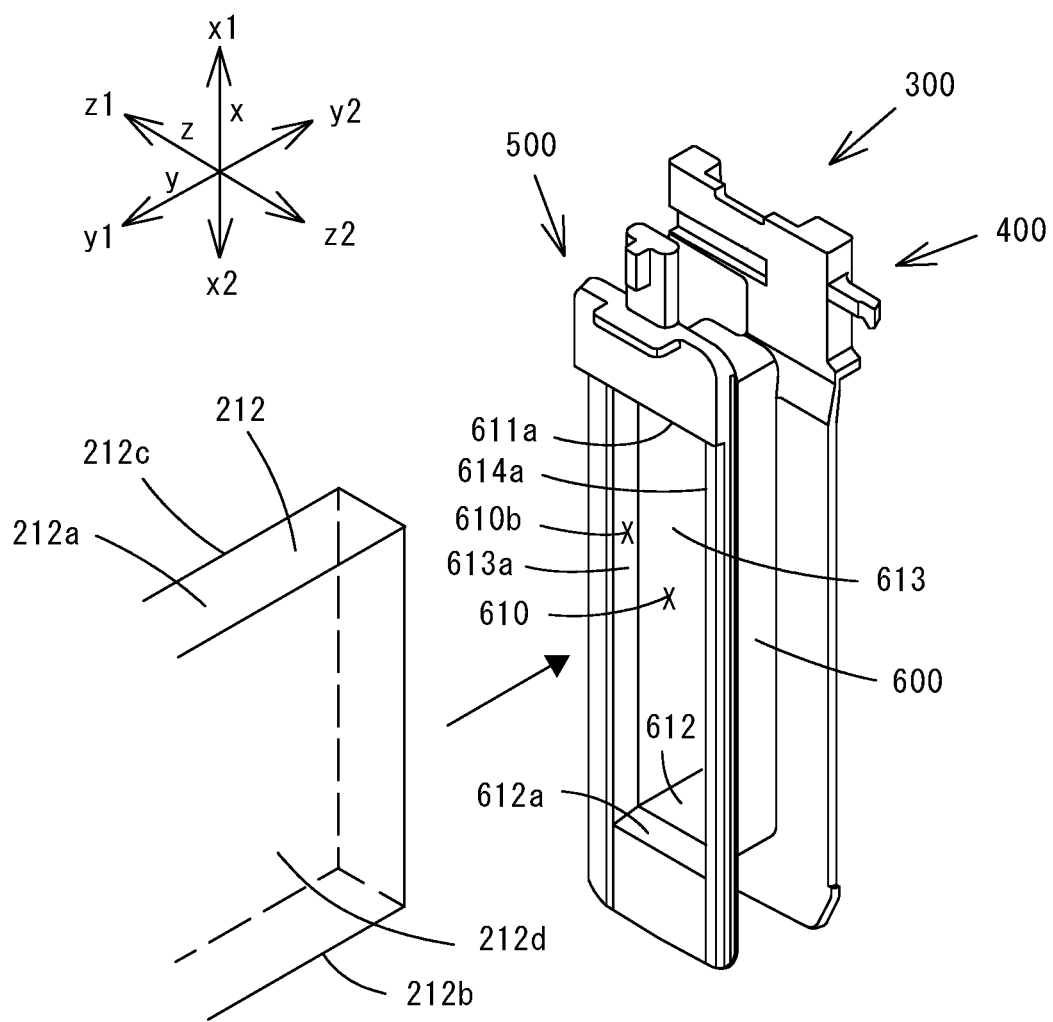
FIG. 11 schematically illustrates how to mount the electrical insulator assembly onto a tooth.

In this embodiment, as shown in FIG. 11, the tooth base part 212 is inserted into the through hole 610 from the side of the second flange 500 (the opening 610b side) in such a manner that outer wall surfaces 212a, 212b, 212c and 212d of the tooth base part 212 face the inner wall surfaces 611 to 614 of the through hole 610, respectively.

The inner wall surfaces 611 to 614 of the through hole 610 respectively have inclined faces 611a, 612a, 613a and 614a on the side of the inner peripheral surface 500B (the side of the opening 616b) of the second flange 500. These inclined faces 611a, 612a, 613a and 614a facilitate the insertion of the tooth 211 into the through hole 610 of the electrical insulator assembly 300.

The tooth 211 is inserted into the through hole 610 such that a radially outer end part of the tooth base part 212 protrudes from the outer peripheral surface 400A of the first flange 400.

Figure 5:
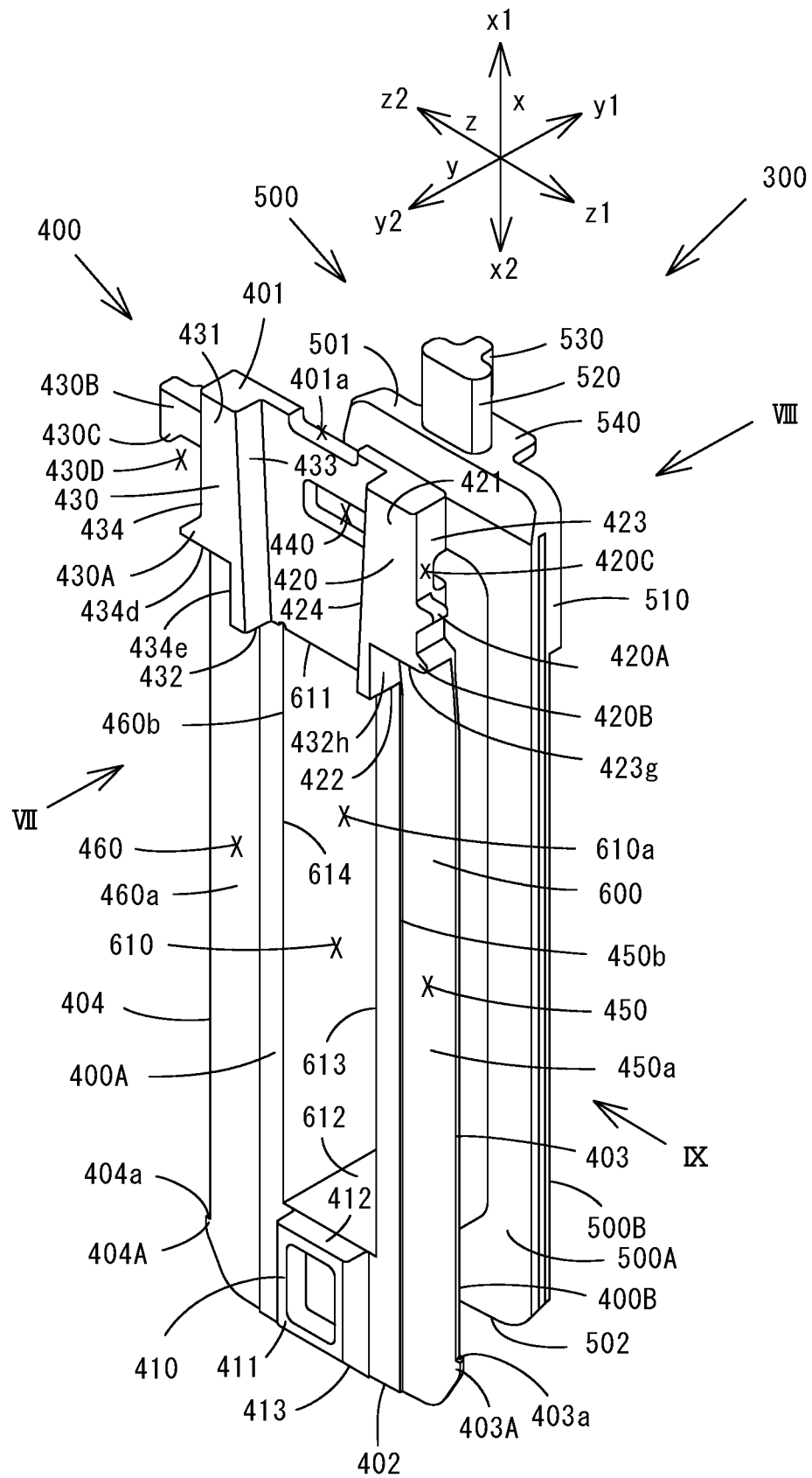
FIG. 5 is a perspective view showing an embodiment of an electrical insulator assembly.
Figure 7:
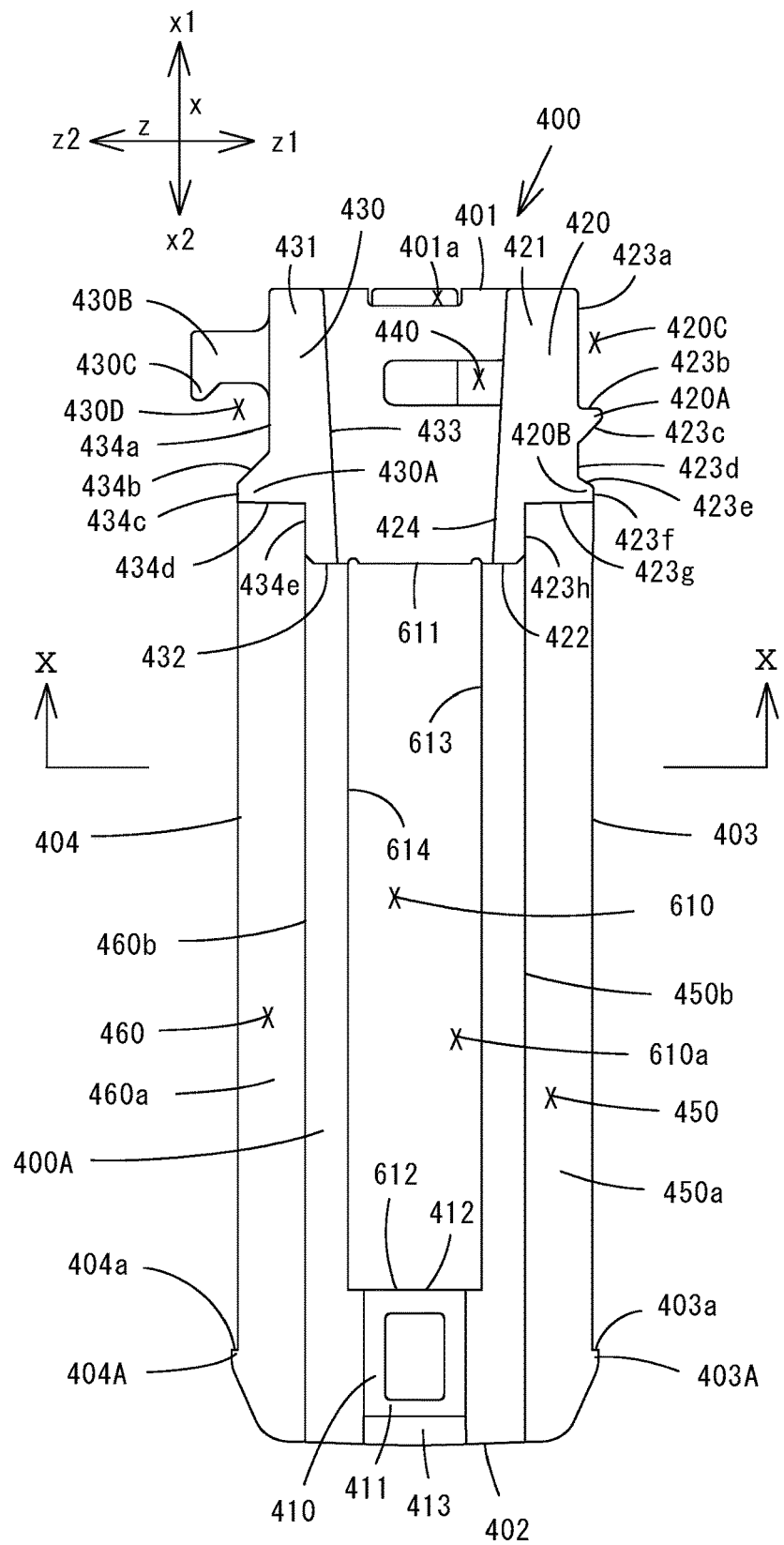
FIG. 7 shows the electrical insulator assembly as viewed from the direction of arrow VII in FIG. 5.

As shown in FIGS. 5 and 7, the first flange 400 has projections 410, 420 and 430 protruding radially outward from the outer peripheral surface 400A.

In this embodiment, the projection 420 and the projection 430 correspond to non-limiting embodiments of a "third projection" and a "fourth projection" according to this disclosure, respectively.

The projection 410 is formed on the second side of the opening 610a of the through hole 610 in the axial direction.

The projection 410 has an (a first) outer wall surface 411 on the radially outer side, an (a second) outer wall surface 412 on the first side in the axial direction, and an (a third) outer wall surface 413 on the second side in the axial direction. The (third) outer wall surface 413 is inclined such that the distance between the (third) outer wall surface 413 and the outer peripheral surface 400A increases in the direction extending from the side of the end surface 402 toward the side of the through hole 610.

The (third) outer wall surface 413 serves as a guide surface when the radially outer end part of the tooth 211 with the electrical insulator assembly 300 mounted thereon is press fitted into the recess 224.

The projection 420 is formed on the first side of the opening 610a of the through hole 610 in the axial direction and on the first side of the opening 610a of the through hole 610 in the circumferential direction.

The projection 420 has an outer wall surface 421 on the radially outer side, an outer wall surface 422 on the second side in the axial direction, an outer wall surface 423 on the first side in the circumferential direction, and an outer wall surface 424 on the second side in the circumferential direction. Further, an outer wall surface of the projection 420 on the first side in the axial direction is formed by the end surface 401 of the first flange 400.

The outer wall surface 423 has (first to eighth) outer wall surface parts 423a, 423b, 423c, 423d, 423e, 423f, 423g, 423h. The outer wall surface parts 423b and 423c define a projection 420A protruding to the first side in the circumferential direction. The outer wall surface parts 423e, 423f and 423g define a projection 420B protruding to the first side in the circumferential direction on the second side of the projection 420A in the axial direction. The outer wall surface parts 423a and 423h define a recess 420C recessed to the second side in the circumferential direction on the first side of the projection 420A in the axial direction.

The projection 430 is formed on the first side of the opening 610a of the through hole 610 in the axial direction and on the second side of the opening 610a of the through hole 610 in the circumferential direction.

The projection 430 has an outer wall surface 431 on the radially outer side, an outer wall surface 432 on the second side in the axial direction, an outer wall surface 433 on the first side in the circumferential direction, and an outer wall surface 434 on the second side in the circumferential direction. Further, an outer wall surface of the projection 430 on the first side in the axial direction is formed by the end surface 401 of the first flange 400.

The outer wall surface 434 has (first to fifth) outer wall surface parts 434a, 434b, 434c, 434d, 434e. The outer wall surface parts 434b, 434c and 434d define a projection 430A protruding to the second side in the circumferential direction.

A projection 430B is provided on the (first) outer wall surface part 434a of the outer wall surface 434 of the projection 430 and protrudes to the second side in the circumferential direction. The projection 430B has a projection 430C protruding to the second side in the axial direction from its end part on the second side in the circumferential direction.

The outer wall surface parts 434a and 434b and the projections 430B and 430C define a recess 430D recessed to the first side in the circumferential direction on the first side of the projection 430A in the axial direction.

The first flange 400 further has recessed parts 450 and 460 that are recessed radially inward from the outer peripheral surface 400A.

The recessed part 450 is formed on the first side of the opening 610a of the through hole 610 in the circumferential direction.

The recessed part 450 is formed by a bottom surface 450a, a wall surface on the first side in the axial direction, and a wall surface on the second side in the circumferential direction. Thus, the recessed part 450 is open radially outwardly to the first side in the circumferential direction and to the second side in the axial direction.

The bottom surface 450a extends in the axial direction and the circumferential direction.

The wall surface of the recessed part 450 on the first side in the axial direction is formed continuously with an end of the bottom surface 450a on the first side in the axial direction and extends in the radial direction and the circumferential direction. In this embodiment, the wall surface of the recessed part 450 on the first side in the axial direction is formed by the outer wall surface 423 (the outer wall surface part 423g) of the projection 420.

The wall surface of the recessed part 450 on the second side in the circumferential direction is formed continuously with an end of the bottom surface 450a on the second side in the circumferential direction and extends in the axial direction and the radial direction. In this embodiment, the wall surface of the recessed part 450 on the second side in the circumferential direction is formed by a wall surface 450b and the outer wall surface 423 (the outer wall surface part 423h) of the projection 420.

In this embodiment, the bottom surface 450a is a flat surface (or a substantially flat surface). The wall surface of the recessed part 450 on the first side in the axial direction and the wall surface of the recessed part 450 on the second side in the circumferential direction are formed to extend in a direction perpendicular (or substantially perpendicular) to the bottom surface 450a. The shape of the bottom surface 450a and the angles of inclination of the wall surfaces of the recessed part 450 on the first side in the axial direction and the second side in the circumferential direction with respect to the bottom surface 450a are not limited to these.

The recessed part 460 is formed on the second side of the opening 610a of the through hole 610 in the circumferential direction.

The recessed part 460 is formed by a bottom surface 460a, a wall surface on the first side in the axial direction, and a wall surface on the first side in the circumferential direction. Thus, the recessed part 460 is open radially outwardly, to the second side in the circumferential direction, and to the second side in the axial direction.

The bottom surface 460a extends in the axial direction and the circumferential direction.

The wall surface of the recessed part 460 on the first side in the axial direction is formed continuously to an end of the bottom surface 460a on the first side in the axial direction and extends in the radial direction and the circumferential direction. In this embodiment, the wall surface of the recessed part 460 on the first side in the axial direction is formed by the outer wall surface 434 (the outer wall surface part 434d) of the projection 430.

The wall surface of the recessed part 460 on the first side in the circumferential direction is formed continuously to (with) an end of the bottom surface 460a on the first side in the circumferential direction and extends in the axial direction and the radial direction. In this embodiment, the wall surface of the recessed part 460 on the first side in the circumferential direction is formed by a wall surface 460b and the outer wall surface 434 (the outer wall surface part 434e) of the projection 430.

In this embodiment, the bottom surface 460a is a flat surface (or a substantially flat surface). The wall surface of the recessed part 460 on the first side in the axial direction and the wall surface of the recessed part 460 on the first side in the circumferential direction are formed to extend in a direction perpendicular (or substantially perpendicular) to the bottom surface 460a. The shape of the bottom surface 460a and the angles of inclination of the wall surfaces of the recessed part 460 on the first side in the axial direction and the first side in the circumferential direction with respect to the bottom surface 460a are not limited to these.

In this embodiment, the recessed part 450 and the bottom surface 450a correspond to non-limiting embodiments of a "first recessed part" and a "first bottom surface" according to this disclosure, respectively. The "first wall surface" according to this disclosure is formed by the outer wall surface 423 (the outer wall surface part 423g) of the projection 420. The "second wall surface" according to this disclosure is formed by the wall surface 450b and the outer wall surface 423 (the outer wall surface part 423h) of the projection 420.

Further, the recessed part 460 and the bottom surface 460a correspond to non-limiting embodiments of a "second recessed part" and a "second bottom surface" according to this disclosure, respectively. The "third wall surface" according to this disclosure is formed by the outer wall surface 434 (the outer wall surface part 434d) of the projection 430. The "fourth wall surface" according to this disclosure is formed by the wall surface 460b and the outer wall surface 434 (the outer wall surface part 434e) of the projection 430.

The first flange 400 has projections 403A and 404A on the side surfaces 403 and 404.

The projection 403A is formed on the second side of the opening 610a of the through hole 610 in the axial direction on the side surface 403 and protrudes from the side surface 403 to the first side in the circumferential direction. The projection 403A has an end surface 403a formed continuously to (with) the side surface 403 on the first side in the axial direction and extending in the radial direction and the circumferential direction.

The projection 404A is formed on the second side of the opening 610a of the through hole 610 in the axial direction on the side surface 404 and protrudes from the side surface 404 to the second side in the circumferential direction. The projection 404A has an end surface 404a formed continuously to (with) the side surface 404 on the first side in the axial direction and extending in the radial direction and the circumferential direction.

In this embodiment, the projections 403A and 404A are formed at the same (or substantially the same) position (e.g. at the same distance from the end surface 402) in the axial direction.

The projections 403A and 404A serve as movement restriction parts for restricting movement of the first end part 810 and the second end part 840 of the electrical insulation member 800 to the second side in the axial direction. Further, the end surfaces 403a and 404a serve as movement restriction surfaces for restricting movement of the first end part 810 and the second end part 840 of the electrical insulation member 800 to the second side in the axial direction.

In this embodiment, the projection 403A and the end surface 403a correspond to non-limiting embodiments of a "first projection" and an "end surface of the first projection on the first side in the axial direction" according to this disclosure, respectively. Further, the projection 404A and the end surface 404a correspond to non-limiting embodiments of a "second projection" and an "end surface of the second projection on the first side in the axial direction" according to this disclosure, respectively.

A recess 401a is formed in the end surface 401 of the first flange 400 and is open to the first side in the axial direction and radially outwardly and inwardly.

Further, a radially extending hole 440 is formed between the projections 420, 430.

Figure 6:
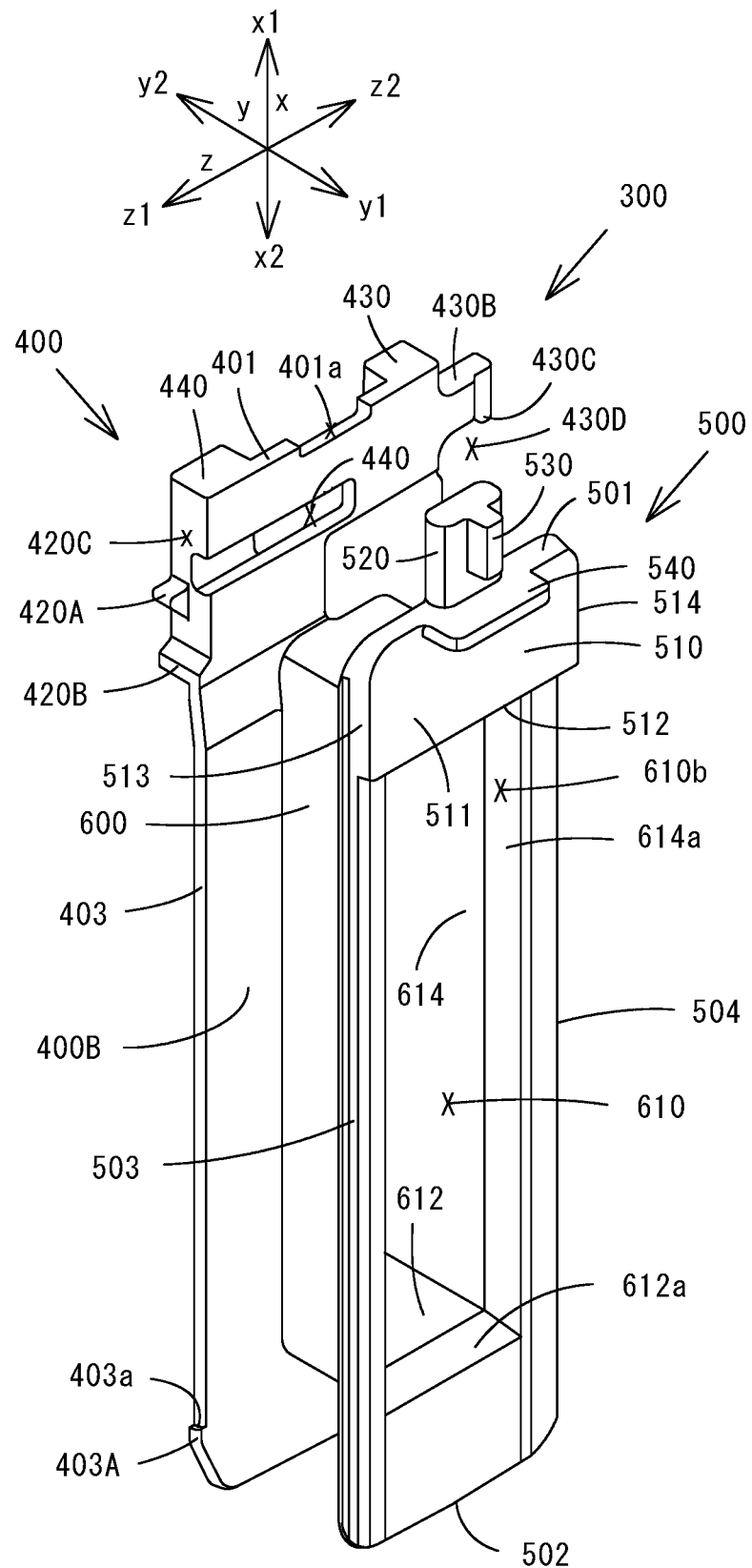
FIG. 6 is a perspective view showing the embodiment of the electrical insulator assembly of FIG. 5, as viewed from the opposite direction.
Figure 8:
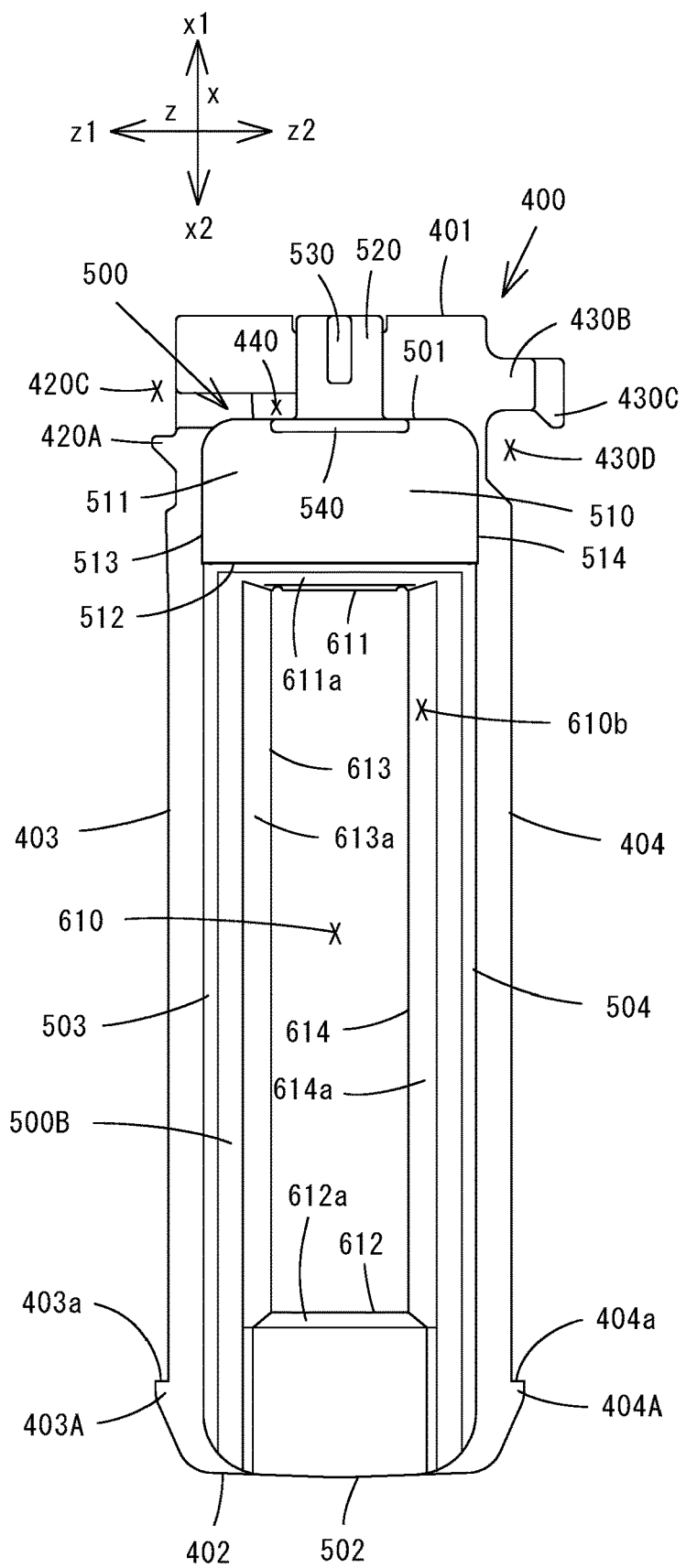
FIG. 8 shows the electrical insulator assembly as viewed from the direction of arrow VIII in FIG. 5.
Figure 9:
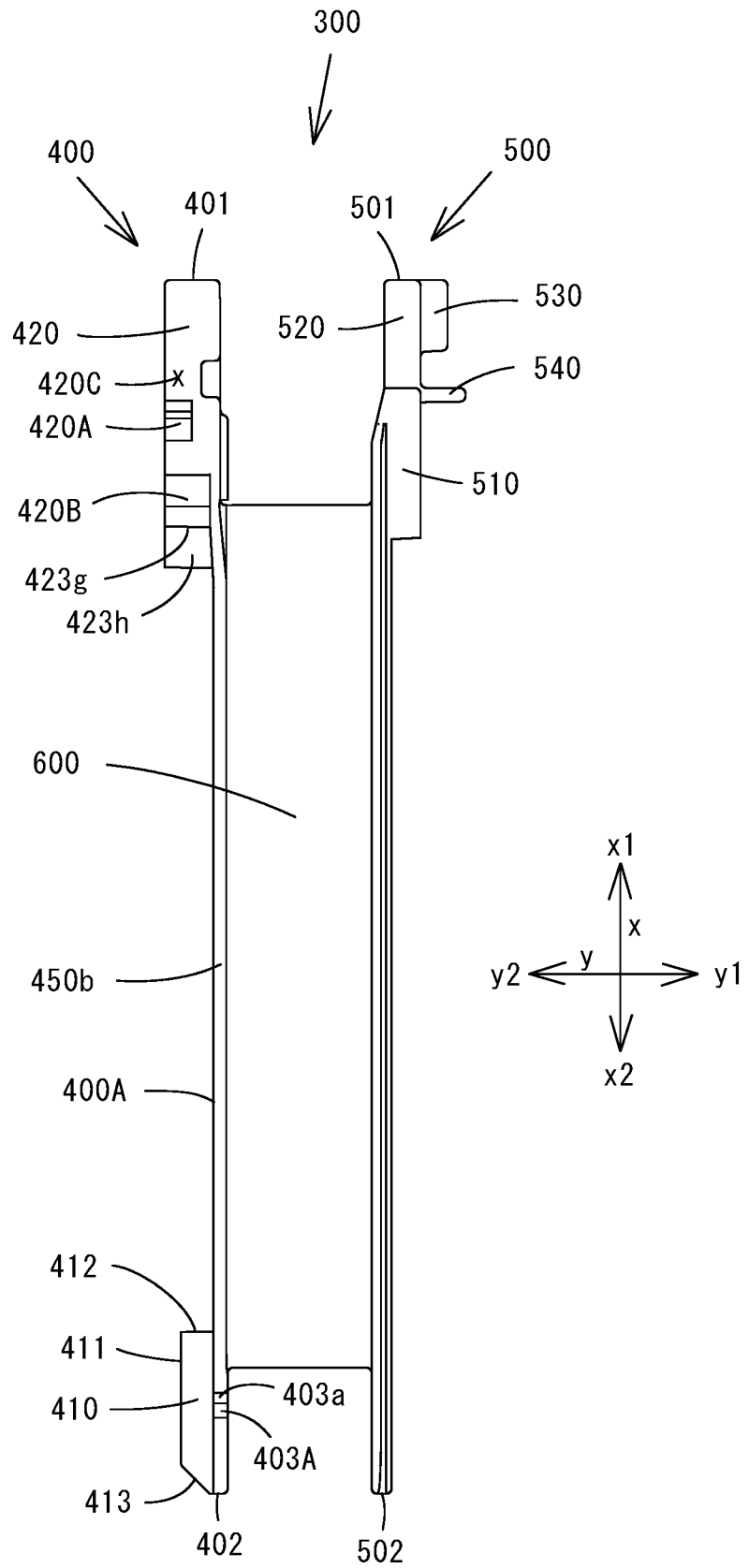
FIG. 9 shows the electrical insulator assembly as viewed from the direction of arrow IX in FIG. 5.
Figure 10:
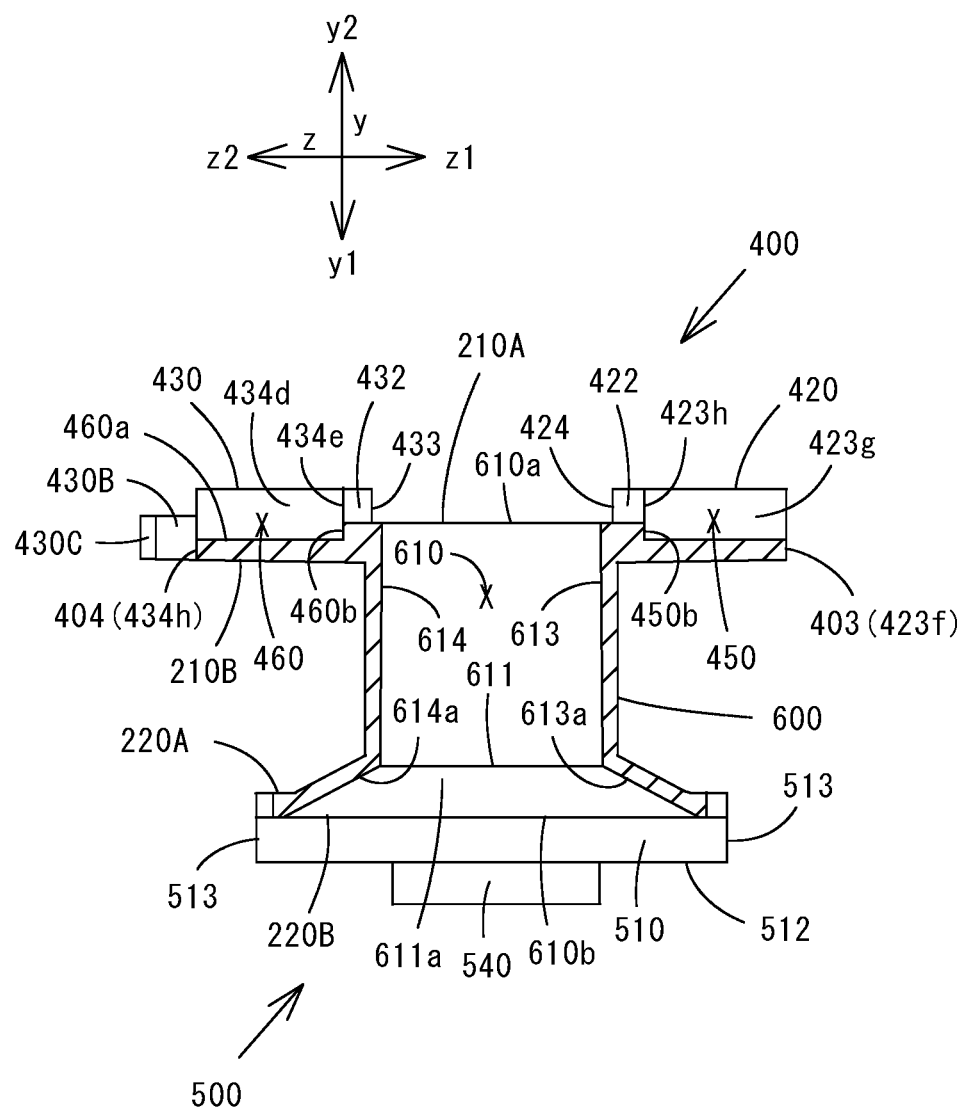
FIG. 10 is a sectional view taken along line X-X in FIG. 7.

As shown in FIGS. 6 and 8, the second flange 500 has a projection 510 that protrudes radially inward from the inner peripheral surface 500B. The projection 510 is formed on the first side of the opening 610b of the through hole 610 on the inner peripheral surface 500B.

The projection 510 has a radially-inward outer wall surface 511, an outer wall surface 512 on the second side in the axial direction, an outer wall surface 513 on the first side in the circumferential direction, and an outer wall surface 514 on the second side in the circumferential direction. Further, an outer wall surface of the projection 510 on the first side in the axial direction is formed by the end surface 501 of the second flange 500.

Further, the second flange 500 has a projection 520 protruding from the end surface 501 to the first side in the axial direction. The projection 520 has a projection 530 that protrudes radially inward. In this embodiment, the projection 530 is formed on the first side in the axial direction on the projection 520. The projection 530 restricts movement of an end part of the stator winding 700 wound around the projection 520 to the first side in the axial direction.

The second flange 500 further has a projection 540 protruding radially inward between the projection 530 and the opening 610b of the through hole 610. In this embodiment, the projection 540 is formed on the first side in the axial direction on the projection 510 and extends in the circumferential direction and the radial direction. Further, in this embodiment, the projection 540 is formed flush with the end surface 501 of the second flange 500. The provision of the projection 540 improves dielectric strength between the end part of the stator winding 700 wound around the projection 520 and the corresponding tooth 211 inserted into the through hole 610 of the electrical insulator assembly 300.

The arrangement position of the projection 540 may just be between the projection 530 and the opening 610b of the through hole 610, and it may be appropriately changed.

In this embodiment, the projections 520, 530, 540 correspond to non-limiting embodiments of a "fifth projection", a "sixth projection" and a "seventh projection" according to this disclosure, respectively.

The stator windings 700 are wound around the electrical insulator assemblies 300 mounted on the teeth 211. Thus, the stator windings 700 are respectively wound around the teeth 211 in a concentrated manner.

Various methods may be employed to wind the stator windings 700 around the electrical insulator assemblies 300. For example, the electrical insulator assemblies 300 may be mounted onto the teeth 211 with the stator windings 700 already wound on the electrical insulator assemblies 300, or the stator windings 700 may be wound around the electrical insulator assemblies 300 with the electrical insulator assemblies 300 already mounted on the teeth 211.

Assembling of the first core member 210 and the second core member 220 is now described.

First, the electrical insulator assemblies 300 are mounted onto the teeth 211 (the teeth base parts 212) of the first core member 210 (see FIG. 11).

Then the first core member 210 and the second core member 220 are assembled together with the electrical insulator assemblies 300 already mounted on the teeth 211 and with the stator windings 700 already wound on the electrical insulator assemblies 300.

In this embodiment, the radially outer end parts of the teeth 211 protruding from the outer peripheral surface 400A of the first flange 400 are press fitted into the recesses 224 of the yoke 221 of the second core member 220.

At this time, each of the radially outer end parts of the teeth 211 is guided into the recess 224 by the outer wall surface 413 of the projection 410.

A press-fitting jig may be used to apply a force to the outer wall surface 212a of the tooth 211 protruding from the outer peripheral surface 400A of the first flange 400 in order to move the radially outer end part of the tooth 211 in a direction to be inserted into the recess 224. In this embodiment, the outer wall surface 424 of the projection 420 and the outer wall surface 433 of the projection 430 form a moving path for guiding movement of the press-fitting jig.

The electrical insulation member 800 is provided to insulate the stator windings 700 wound around the electrical insulator assemblies 300 and the yoke 221 of the stator core 200.

In this embodiment, the electrical insulation member 800 is arranged across the electrical insulator assemblies 300 adjacent to each other in the circumferential direction between the adjacent electrical insulator assemblies 300 and the yoke 221 of the stator core 200.

The electrical insulation member 800 is formed as an electrical insulation film of resin (polymer) having electrical insulating properties, such as polyethylene terephthalate resin and polyethylene naphthalate resin.

The electrical insulation member 800 may just be configured to insulate the stator windings 700 wound around the electrical insulator assemblies 300 and the yoke 221. Thus, the whole of the electrical insulation member 800 need not be arranged between the electrical insulator assemblies 300 and the yoke 221, and at least part of the electrical insulation member 800 may just be arranged between the electrical insulator assemblies 300 and the yoke 221.

The electrical insulation member 800 is now described with reference to FIG. 12.

The electrical insulation member 800 is formed by folding a rectangular electrical insulation film (foil, sheet) having four edges 800a, 800b, 800c and 800d. The edges 800a and 800b are opposed to each other in the circumferential direction and extend in the axial direction (x direction), and the edges 800c and 800d are opposed to each other in the axial direction and extend in the circumferential direction (z direction).

The electrical insulation film is divided by axially extending folding lines 801 to 803 into a first end part 810, a first central part 820, a second central part 830 and a second end part 840, which extend in the axial direction and the circumferential direction.

The electrical insulation member 800 has a central part folded along the folding line 802 in a V shape into the first central part 820 and the second central part 830.

The electrical insulation member 800 further has a first end part and a second end part (the first end part 810 and the second end part 840) folded in directions away from each other along the folding lines 801 and 803.

Thus, the electrical insulation member 800 is formed having the central part extending in the axial direction and the radial direction, and the first and second end parts folded in directions away from each other from the radially outer ends of the central part and extending in the axial direction and the circumferential direction.

Figure 12:
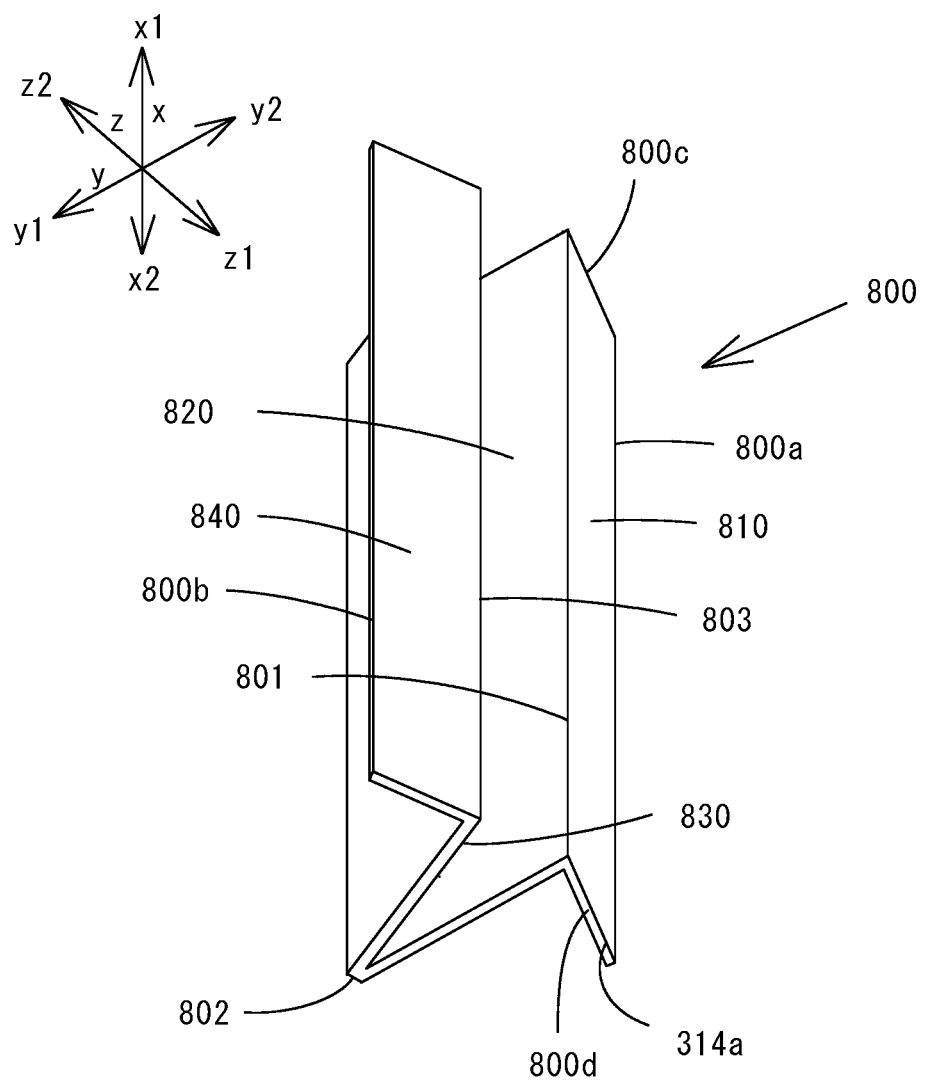
FIG. 12 is a perspective view showing an example of an electrical insulation member.

Further, the electrical insulation member 800 shown in FIG. 12 has the same shape when viewed from the first side in the axial direction as when viewed from the second side in the axial direction. Therefore, in use, the first end part 810 may be arranged on the first side in the circumferential direction, while the second end part 840 is arranged on the second side in the circumferential direction, or vice versa.

In this embodiment, the electrical insulation member 800 corresponds to a non-limiting embodiment of an "electrical insulation member" according to this disclosure. The first central part 820 and the second central part 830 form the "central part" according to this disclosure. Further, one of the first end part 810 and the second end part 840 corresponds to a non-limiting embodiment of a "first end part" or a "second end part" according to this disclosure, and the other of the first end part 810 and the second end part 840 corresponds to a non-limiting embodiment of a "second end part" or a "first end part" according to this disclosure.

An exemplary method for arranging the electrical insulation member 800 across the electrical insulator assemblies 300 adjacent to each other in the circumferential direction between the adjacent electrical insulator assemblies 300 and the yoke 221 of the stator core 200 is now described with reference to FIGS. 13 to 15.

Figure 13:
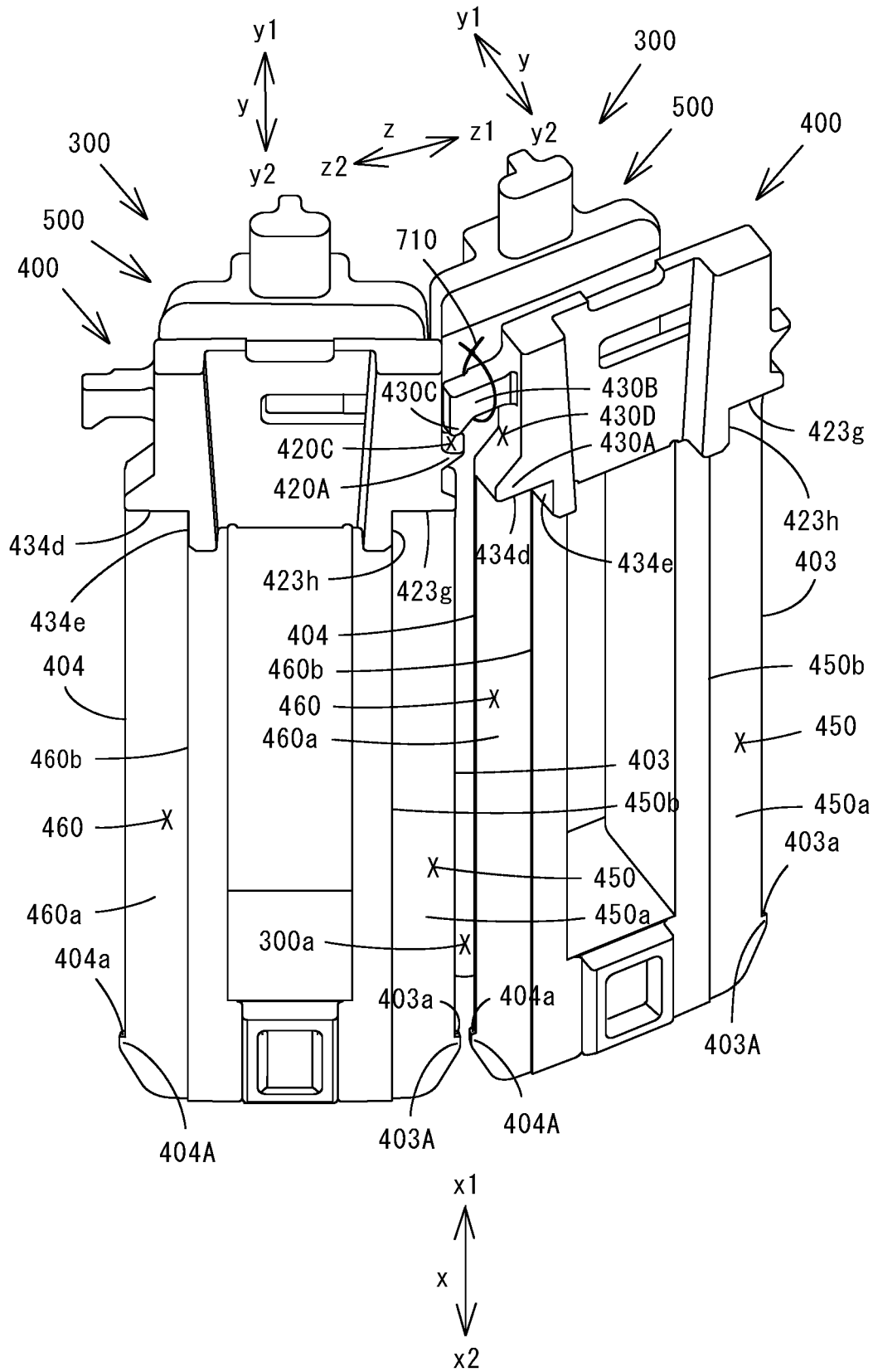
FIG. 13 shows the electrical insulator assemblies mounted onto adjacent teeth.

FIG. 13 shows two electrical insulator assemblies 300 respectively mounted onto the teeth 211 adjacent to each other in the circumferential direction.

In the following description, the electrical insulator assembly 300 is referred to as an "assembly 300". Further, as for the two electrical insulator assemblies 300 adjacent to each other in the circumferential direction, the electrical insulator assembly 300 arranged on the first side in the circumferential direction is referred to as a "first assembly 300", and the electrical insulator assembly 300 arranged on the second side in the circumferential direction is referred to as a "second assembly 300". The electrical insulation member 800 is referred to as an "insulation member 800".

A gap extending in the axial direction and the circumferential direction is formed between the assembly 300 and the yoke 221 when the first core member 210 and the second core member 220 are assembled together.

The gap between the assembly 300 and the yoke 221 includes a gap (hereinafter referred to as a "first gap") formed on the first side in the circumferential direction and a gap (hereinafter referred to as a "second gap") formed on the second side in the circumferential direction.

The first gap is formed between a part (on which the recessed part 450 is formed) of the outer peripheral surface 400A of the first flange 400 on the first side of the opening 610a of the through hole 610 in the circumferential direction and the yoke inner peripheral surface part 223a (see FIG. 4) of the yoke 221.

The second gap is formed between a part (on which the recessed part 460 is formed) of the outer peripheral surface 400A of the first flange 400 on the second side of the opening 610a of the through hole 610 in the circumferential direction and the yoke inner peripheral surface part 223b (see FIG. 4) of the yoke 221.

Further, a gap 300a (see FIG. 13) is formed between the side surface 404 of the first flange 400 of the first assembly 300 and the side surface 403 of the first flange 400 of the second assembly 300.

Figure 14:
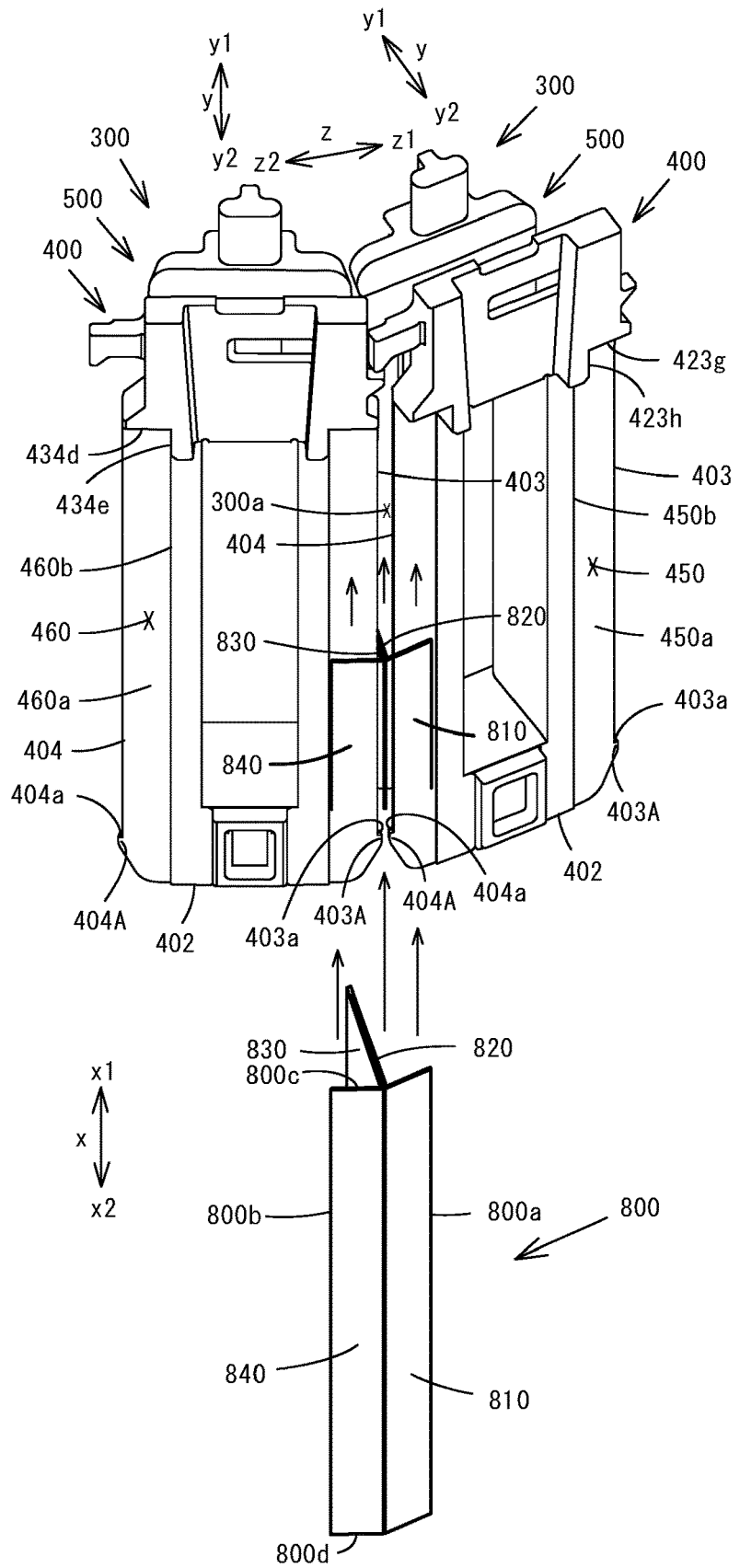
FIG. 14 schematically illustrates how to arrange an example of the electrical insulation member.

As shown in FIG. 14, the insulation member 800 is folded such that the distance between the first and second end parts 810, 840 is shortened, and inserted between the first and second assemblies 300 and the yoke 221 from the second side in the axial direction.

Specifically, a part of the first end part 810 on the first side in the axial direction is inserted into the second gap between the first assembly 300 and the yoke 221 (the yoke inner peripheral surface part 223b). A part of the second end part 840 on the first side in the axial direction is inserted into the first gap between the second assembly 300 and the yoke 221 (the yoke inner peripheral surface part 223a). Further, a part of the central part (the central parts 820, 830) on the first side in the axial direction is inserted into the gap 300a between the first assembly 300 and the second assembly 300.

In the assemblies disclosed in the JP patent publications discussed in the background section above, the recessed parts formed on both sides in the circumferential direction in the first flange have wall surfaces on the first and second sides in the axial direction.

Therefore, in the prior art, the electrical insulation member needs to be tilted when inserted into a second gap formed between the first assembly and the yoke, a second gap formed between the second assembly and the yoke, and a gap formed between the first and second assemblies. Specifically, the first end part needs to be tilted with respect to the extending direction of the outer peripheral surface of the first flange of the first assembly, and the second end part needs to be tilted with respect to the extending direction of the outer peripheral surface of the first flange of the second assembly.

In the assembly 300 of the present embodiment, however, the recessed parts 450 and 460 formed on the outer peripheral surface 400A of the first flange 400 are open to the second side in the axial direction.

Therefore, the insulation member 800 need not be tilted when inserted between the first and second assemblies 300 and the yoke 221. Specifically, the first end part 810 can be inserted into the second gap between the first assembly 300 and the yoke 221 (the yoke inner peripheral surface part 223b), in parallel (or substantially in parallel) to the extending direction of the bottom surface 460a of the recessed part 460 of the first assembly 300. Further, the second end part 840 can be inserted into the first gap between the second assembly 300 and the yoke 221 (the yoke inner peripheral surface part 223a) in parallel (or substantially in parallel) to the extending direction of the bottom surface 450a of the recessed part 450 of the second assembly 300.

Subsequently, the insulation member 800 is moved to the first side in the axial direction.

When the insulation member 800 is moved until the edge 800d reaches a position corresponding to the projection 404A (the end surface 404a) of the first assembly 300 and the projection 403A (the end surface 403a) of the second assembly 300, a gap between the first end part 810 and the second end part 840 is widened by elastic force.

Figure 15:
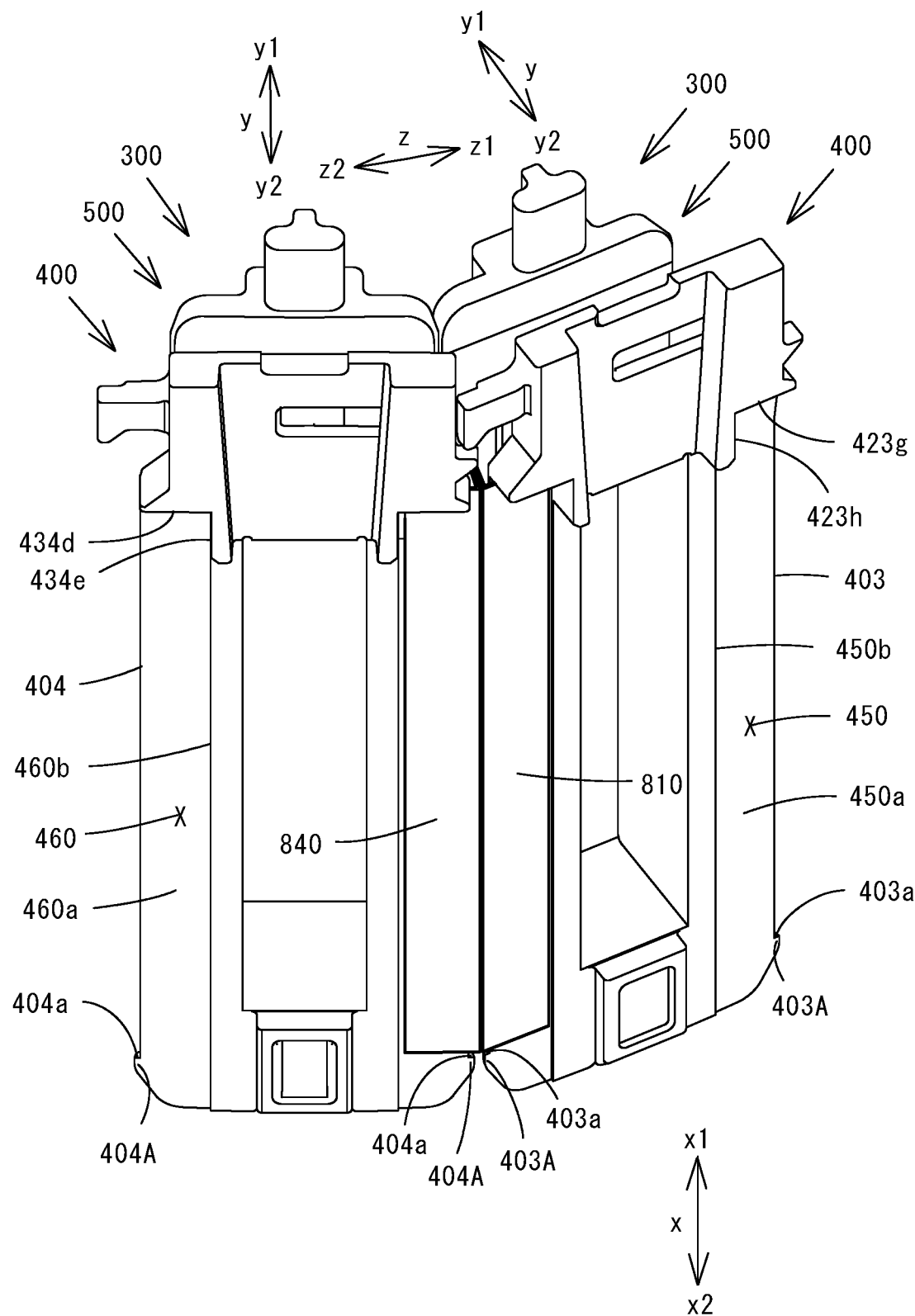
FIG. 15 shows the example of the electrical insulation member arranged in place.

Thus, the insulation member 800 is placed as shown in FIG. 15. Specifically, the first end part 810 is inserted into the recessed part 460 of the first assembly 300, and the second end part 840 is inserted into the recessed part 450 of the second assembly 300.

At this time, the insulation member 800 (the first end part, the second end part, the central part) improves dielectric strength between the stator windings 700 respectively wound around the first and second assemblies 300 adjacent to each other in the circumferential direction and the yoke 221.

Further, the central part (the central parts 820, 830) of the insulation member 800 is inserted into the gap 300a between the first assembly 300 and the second assembly 300 and placed between the stator windings 700 respectively wound around the first and second assemblies 300. The stator windings 700 having different phases from each other are respectively wound around the first and second assemblies 300 adjacent to each other in the circumferential direction. Therefore, the central part (the central parts 820, 830) of the insulation member 800 improves dielectric strength between the stator windings 700 of different phases that are respectively wound around the adjacent first and second assemblies 300.

As described above, the insulation member 800 has the same shape when viewed from the first side in the axial direction as when viewed from the second side in the axial direction. Therefore, the insulation member 800 can also be inserted from the edge 800d side of the insulation member 800. In this case, the second end part 840 corresponds to a non-limiting embodiment of a "first end part", and the first end part 810 corresponds to a non-limiting embodiment of a "second end part" according to this disclosure.

Movement of the insulation member 800 to the first and second sides in the axial direction is restricted by elastic force of the insulation member 800.

The insulation member 800 may however be moved to the first or second side in the axial direction by external force.

In this embodiment, in the state shown in FIG. 15, movement of the insulation member 800 to the first side in the axial direction is restricted by at least either the wall surface (the outer wall surface part 434d) of the recessed part 460 of the first assembly 300 on the first side in the axial direction or the wall surface (the outer wall surface part 423g) of the recessed part 450 of the second assembly 300 on the first side in the axial direction.

Further, movement of the insulation member 800 to the second side in the axial direction is restricted by the projection 404A (the end surface 404a) of the first assembly 300 and the projection 403A (the end surface 403a) of the second assembly 300. Specifically, movement of the insulation member 800 to the second side in the axial direction is restricted by abutment of the edge 800d of the insulation member 800 on at least either the projection 404A (the end surface 404a) of the first assembly 300 or the projection 403A (the end surface 403a) of the second assembly 300.

An exemplary method for fixing an end part of each of the stator windings 700 is now described with reference to FIG. 13.

In the state in which the assemblies 300 are mounted onto the respective teeth 211, the projection 430B of the first assembly 300 is located within the recess 420C of the second assembly 300. Thus, a working space is formed between the projections 430A, 430B of the first assembly 300 and the projection 420A of the second assembly 300.

Provision of this working space facilitates the operation of binding and fixing the end part of the stator winding 700 wound around the assembly 300 to the projection 430B of the first assembly 300 with a string 710. At this time, the projection 430C formed on the projection 430B of the first assembly 300 help to block (prevent) the string 710 from slipping off the projection 430B.

Further, the end part of the stator winding 700 wound around the assembly 300 may be wound around the projection 520 (see FIG. 6) of the assembly 300. The projection 530 restricts the end part of the stator winding 700 wound around the projection 520 from moving to the first side in the axial direction.

In this case, electrical breakdown may occur between the end part of the stator winding 700 wound around the projection 520 and the corresponding tooth 211 inserted into the through hole 610 of the assembly 300.

In the assembly 300 of this embodiment, as described above, the projection 540 is formed protruding radially inward of the inner peripheral surface 500B of the second flange 500 between the projection 530 and the opening 610b of the through hole 610.

This improves dielectric strength between the end part of the stator winding 700 wound around the projection 520 and the corresponding tooth 211 inserted into the through hole 610 of the assembly 300.

The projection 530 may be omitted. In this case, the projection 540 is formed between the opening 610b of the through hole 610 and the end surface 501 of the second flange 500.

In the above-described embodiment, the electrical insulation member 800 folded in a V shape is used, but the shape is not limited to this.

Figure 16:
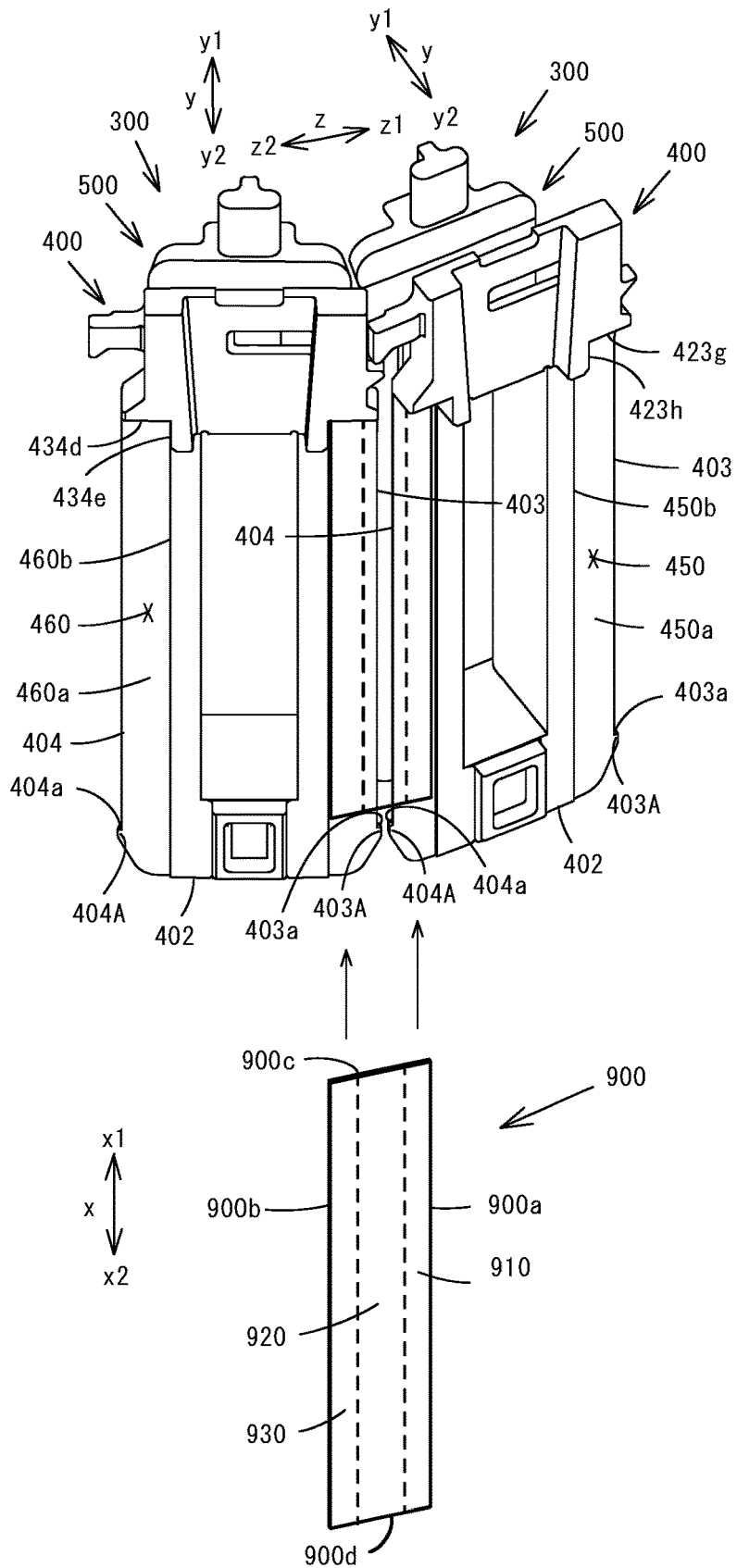
FIG. 16 schematically illustrates how to arrange a different electrical insulation member.

A flat plate-like electrical insulation member 900 is now described with reference to FIG. 16.

The electrical insulation member 900 (hereinafter referred to as "insulation member 900") is formed as a rectangular electrical insulation film having four edges 900a, 900b, 900c and 900d. The edges 900a and 900b are opposed to each other in the circumferential direction and extend in parallel (or substantially in parallel) in the axial direction, and the edges 900c and 900d are opposed to each other in the axial direction and extend in parallel (or substantially in parallel) in the circumferential direction.

The insulation member 900 has a central part 920 and first and second end parts 910 and 930 extending in the axial direction and the circumferential direction on the first and second sides of the central part 920 in the circumferential direction.

Like the insulation member 800, the insulation member 900 has the same shape when viewed from the first side in the axial direction as when viewed from the second side in the axial direction. Thus, in use, the first end part 910 may be arranged on the first side in the circumferential direction, while the second end part 930 is arranged on the second side in the circumferential direction, or vice versa.

The insulation member 900 is arranged across the electrical insulator assemblies 300 adjacent to each other in the circumferential direction between the adjacent electrical insulator assemblies 300 and the yoke 221 of the stator core 200 in the same manner as the insulation member 800, except that the central part of the insulation member 800 is inserted into the gap 300a.

Specifically, the first end part 910 is inserted into the second gap between the first assembly 300 and the yoke 221 (the yoke inner peripheral surface part 223b), and the second end part 930 is inserted into the first gap between the second assembly 300 and the yoke 221 (the yoke inner peripheral surface part 223a). At this time, like the insulation member 800, the insulation member 900 need not be tilted. Specifically, the first end part 910 of the insulation member 900 can be inserted into the second gap between the first assembly 300 and the yoke 221 in parallel (or substantially in parallel) to the extending direction of the bottom surface 460a of the recessed part 460 of the first assembly 300. Further, the second end part 930 of the insulation member 900 can be inserted into the first gap between the second assembly 300 and the yoke 221 in parallel (or substantially in parallel) to the extending direction of the bottom surface 450a of the recessed part 450 of the second assembly 300.

In this embodiment, the electrical insulation member 900 corresponds to a non-limiting embodiment of an "electrical insulation member" according to this disclosure. Further, one of the first end part 910 and the second end part 930 corresponds to a non-limiting embodiment of a "first end part" according to this disclosure, and the other of the first end part 910 and the second end part 930 corresponds to a non-limiting embodiment of a "second end part" according to this disclosure.

The present disclosure is not limited to the structures described in the above embodiment, but rather, may be added to, changed, replaced with alternatives or otherwise modified.

The shapes of the first projection formed on the first side surface of the first flange, the end surface of the first projection formed on the first side in the axial direction, the second projection formed on the second side surface of the first flange, and the end surface of the second projection formed on the first side in the axial direction may be appropriately changed.

The first projection is formed on the first side surface of the first flange and has the end surface on the first side in the axial direction, and the second projection is formed on the second side surface of the first flange and has the end surface on the first side in the axial direction, but the end surfaces of the first and second projections may be omitted. Further, the first and second projections may also be omitted.

The present disclosure may also be configured as the electrical insulator assembly, the stator or the motor.

The shape and number of the split core members that form the stator core may be appropriately changed.

The shape of the electrical insulator assembly may be appropriately changed.

The electrical insulation member may have various shapes such as a V shape, a U shape or a flat plate-like shape Any of the technical features of the above embodiment may be used separately or in combination of appropriately selected ones.

The motor of the present disclosure may be used as a driving motor for driving various equipment such as a compressor (a compression mechanism part), a vehicle and onboard equipment.

The (ordinal) number (such as "first" and "second") of each of the projections in the above-described embodiment may be appropriately changed.

DESCRIPTION OF THE REFERENCE NUMERALS

100: stator
200: stator core
200A, 200B: core end surface
210: first core member
211: tooth
212: tooth base part
212a, 212b, 212c, 212d: outer wall surface
213: tooth tip part
214: tooth tip surface
215: connecting part
216, 226: calking projection
220: second core member
221: yoke
222: yoke outer peripheral surface
223: yoke inner peripheral surface
223a, 223b: yoke inner peripheral surface part
224: recess
224a: recess forming face
300: electrical insulator assembly
300a: gap
400: first flange
400A: outer peripheral surface
400B: inner peripheral surface,
401, 402: end surface
401a: recess
403, 404: side surface
403A, 404A: projection
403a, 404a: end surface
410, 420, 420A, 420B, 430, 430A, 430B, 430C: projection
411 to 413, 421 to 424, 431 to 434: outer wall surface
423a to 423h, 434a to 434e: outer wall surface part
420C, 430D: recess
440: hole
450, 460: recessed part
450a, 460a: bottom surface
450b, 460b: wall surface
500: second flange
500A: outer peripheral surface
500B: inner peripheral surface
501, 502: end surface
503, 504: side surface
510, 520, 530, 540: projection
511 to 514: outer wall surface
600: body
610: through hole
610a, 610b: opening
611, 612, 613, 614: inner wall surface
611a, 612a, 613a, 614a: inclined face
700: stator winding
710: string
800, 900: electrical insulation member
800a to 800d, 900a to 900d: edge
801, 802, 803: folding line
810, 840, 910, 930: end part
820, 830, 920: central part

The invention claimed is:

1. Electrical insulator assemblies configured to be respectively fitted onto radially-extending teeth that are spaced apart from each other in a circumferential direction and also extend in an axial direction, each one of the electrical insulator assemblies comprising:
a first flange that extends in the circumferential direction and the axial direction;
a second flange located radially inward of the first flange and extending in the circumferential direction and the axial direction; and
a radially extending body between the first flange and the second flange,
wherein:
the first flange has a first radially outer peripheral surface, a first radially inner peripheral surface, a first side surface on a first side in the circumferential direction, a second side surface on a second side in the circumferential direction, a first end surface on a first side in the axial direction and a second end surface on a second side in the axial direction, the second flange has a second radially outer peripheral surface, a second radially inner peripheral surface, a third side surface on the first side in the circumferential direction, a fourth side surface on the second side in the circumferential direction, a third end surface on the first side in the axial direction and a fourth end surface on the second side in the axial direction, the body has a through hole that is open to the first outer peripheral surface of the first flange and the second inner peripheral surface of the second flange, the first outer peripheral surface of the first flange has a first recessed part and a second recessed part that are respectively recessed radially inward on the first and second sides of the through hole in the circumferential direction, the first recessed part extends in the axial direction and in the circumferential direction and is open radially outwardly and open to the first side in the circumferential direction and open to the second side in the axial direction, and the second recessed part extends in the axial direction and in the circumferential direction and is open radially outwardly and open to the second side in the circumferential direction and open to the second side in the axial direction.

2. The electrical insulator assemblies as defined in claim 1, wherein the first side surface of the first flange has a first projection that is formed on the second side of the through hole in the axial direction and protrudes to the first side in the circumferential direction, and the second side surface of the first flange has a second projection that is formed on the second side of the through hole in the axial direction and protrudes to the second side in the circumferential direction.

3. The electrical insulator assemblies as defined in claim 2, wherein:
the first projection has an end surface formed continuously with the first side surface on the first side in the axial direction and extending in the radial direction and the circumferential direction, and
the second projection has an end surface formed continuously with the second side surface on the first side in the axial direction and extending in the radial direction and the circumferential direction.

4. The electrical insulator assemblies as defined in claim 1, wherein:
the first recessed part is formed by a first bottom surface extending in the axial direction and the circumferential direction, a first wall surface formed continuously with an end of the first bottom surface on the first side in the axial direction and extending in the circumferential direction and the radial direction, and a second wall surface formed continuously to an end of the first bottom surface on the second side in the circumferential direction and extending in the axial direction and the radial direction, and
the second recessed part is formed by a second bottom surface extending in the axial direction and the circumferential direction, a third wall surface formed continuously with an end of the second bottom surface on the first side in the axial direction and extending in the circumferential direction and the radial direction, and a fourth wall surface formed continuously to an end of the second bottom surface on the first side in the circumferential direction and extending in the axial direction and the radial direction.

5. The electrical insulator assemblies as defined in claim 4, wherein:
the first outer peripheral surface of the first flange has a third projection that is formed on the first side of the through hole in the circumferential direction and on the first side of the through hole in the axial direction and protrudes radially outward and a fourth projection that is formed on the second side of the through hole in the circumferential direction and on the first side of the through hole in the axial direction of the through hole and protrudes radially outward,
at least part of the first and second wall surfaces of the first recessed part is formed by an outer wall surface of the third projection, and
at least part of the third and fourth wall surfaces of the second recessed part is formed by an outer wall surface of the fourth projection.

6. The electrical insulator assemblies as defined in claim 5, wherein:
the second flange has a fifth projection that protrudes from the third end surface to the first side in the axial direction,
the fifth projection has a sixth projection that protrudes radially inward, and
the second flange has a seventh projection that protrudes radially inward from the second inner peripheral surface of the second flange between the sixth projection and the through hole and extends in the circumferential direction and the radial direction.

7. A stator, including:
a stator core that has a yoke extending in an axial direction and a circumferential direction and a plurality of teeth spaced apart from each other in the circumferential direction on a radially inner side of the yoke and extending in the axial direction and a radial direction,
electrical insulator assemblies according to claim 1 respectively fitted onto the teeth,
stator windings that are respectively wound around the electrical insulator assemblies, and
electrical insulation members formed of electrical insulation film, each of the electrical insulation members being arranged across the electrical insulator assemblies adjacent to each other in the circumferential direction between the adjacent electrical insulator assemblies and the yoke of the stator core, wherein:
each of the electrical insulation members has a first end part extending in the axial direction and the circumferential direction on the first side in the circumferential direction and a second end part extending in the axial direction and the circumferential direction on the second side in the circumferential direction, and
the first end part of the electrical insulation member is arranged within the second recessed part of the first flange of one of the adjacent electrical insulator assemblies that is arranged on the first side in the circumferential direction and the second end part of the electrical insulation member is arranged within the first recessed part of the first flange of the other electrical insulator assembly that is arranged on the second side in the circumferential direction.

8. The stator as defined in claim 7, wherein:
the electrical insulation member has a central part extending in the axial direction and the radial direction between the first and second end parts, and the central part of the electrical insulation member is arranged between the second side surface of the first flange of the one electrical insulator assembly arranged on the first side in the circumferential direction and the first side surface of the first flange of the other electrical insulator assembly arranged on the second side in the circumferential direction.

9. The stator as defined in claim 7, wherein the stator core comprises a first core member having the teeth and a second core member having the yoke.

10. A motor, having a stator according to claim 9 and a rotor that is rotatable relative to the stator.

* * * * *